(12) United States Patent
Grannell et al.

(10) Patent No.: US 8,691,182 B2
(45) Date of Patent: Apr. 8, 2014

(54) AMMONIA FLAME CRACKER SYSTEM, METHOD AND APPARATUS

(76) Inventors: Shawn Grannell, Ann Arbor, MI (US); Donald E. Gillespie, Ann Arbor, MI (US)

(*) Notice: Subject to any disclaimer, the term of this patent is extended or adjusted under 35 U.S.C. 154(b) by 0 days.

(21) Appl. No.: 13/370,910

(22) Filed: Feb. 10, 2012

(65) Prior Publication Data

US 2012/0148925 A1  Jun. 14, 2012

Related U.S. Application Data

(63) Continuation-in-part of application No. 13/117,532, filed on May 27, 2011, now abandoned.

(60) Provisional application No. 61/348,898, filed on May 27, 2010, provisional application No. 61/419,490, filed on Dec. 3, 2010.

(51) Int. Cl.
   *C01B 3/00* (2006.01)
   *C01B 3/04* (2006.01)

(52) U.S. Cl.
   CPC .................................. *C01B 3/047* (2013.01)
   USPC ...................................................... 423/658.2

(58) Field of Classification Search
   USPC ...................................................... 423/658.2
   See application file for complete search history.

(56) References Cited

U.S. PATENT DOCUMENTS

| | | | |
|---|---|---|---|
| 1,915,120 A | 6/1933 | Burke | |
| 1,920,886 A | 8/1933 | Pier et al. | |
| 2,013,809 A | 9/1935 | Salisbury | |
| 2,140,254 A | 12/1938 | Zavka | |
| 2,264,693 A | 12/1941 | Gier | |
| 2,519,696 A | 8/1950 | Orr, Jr. | |
| 2,578,193 A * | 12/1951 | Marshall, Jr. | ................. 422/114 |
| 2,601,221 A | 6/1952 | Rosenblatt | |
| 2,606,875 A | 8/1952 | Rosenblatt | |
| 3,025,145 A | 3/1962 | Terpenning | |
| 3,379,507 A | 4/1968 | Becker | |
| 3,505,027 A | 4/1970 | Breitbach | |
| 3,598,538 A | 8/1971 | Peacock | |
| 4,069,071 A | 1/1978 | Normand | |

(Continued)

FOREIGN PATENT DOCUMENTS

| WO | WO-2011/107279 | 9/2011 |
|---|---|---|
| WO | WO-2011/150370 | 12/2011 |

OTHER PUBLICATIONS

Kim, J. et al., A micro reforming system integrated with a heat-recirculating micro-combustor to produce hydrogen from ammonia, International Journal of Hydrogen Energy, 36(3): 1974-83, Dec. 8, 2010.

*Primary Examiner* — Melvin C Mayes
*Assistant Examiner* — Kenneth Vaden
(74) *Attorney, Agent, or Firm* — Gifford, Krass, Sprinkle, Anderson & Citkowski, P.C.

(57) ABSTRACT

Apparatus, methods and systems reside in the decomposition of ammonia into a hydrogen gas mixture. An ammonia-rich gaseous mixture containing ammonia and oxygen enters into a conduit within which combustion and decomposition of the mixture is initiated, thereby liberating hydrogen. A mixture of gaseous products resulting from the reaction is expelled from the outlet of the conduit, the mixture including non-combusted hydrogen gas, which may then be used for other purposes. In the preferred embodiment, the incoming reactants including ammonia and oxygen are heat exchanged with the outgoing product mixture containing non-combusted hydrogen gas.

9 Claims, 9 Drawing Sheets

(56) References Cited

U.S. PATENT DOCUMENTS

| | | |
|---|---|---|
| 4,157,270 A | 6/1979 | Martignoni et al. |
| 4,179,407 A | 12/1979 | Iiyama et al. |
| 4,219,528 A | 8/1980 | Normand |
| 4,478,177 A | 10/1984 | Valdespino |
| 4,750,453 A | 6/1988 | Valdespino |
| 4,755,282 A | 7/1988 | Samish et al. |
| 4,788,004 A | 11/1988 | Pinto et al. |
| 5,055,282 A | 10/1991 | Shikada et al. |
| 5,139,756 A | 8/1992 | Shikada et al. |
| 5,976,723 A | 11/1999 | Boffito et al. |
| 6,007,699 A | 12/1999 | Cole |
| 6,096,106 A | 8/2000 | Ruhl et al. |
| 6,299,847 B1 | 10/2001 | Allen |
| 6,488,905 B2 | 12/2002 | Graville |
| 6,800,386 B1 | 10/2004 | Wang et al. |
| 6,936,363 B2 | 8/2005 | Kordesch et al. |
| 7,527,661 B2 | 5/2009 | Chellappa et al. |
| 7,574,993 B2 | 8/2009 | Gillespie et al. |
| 8,623,285 B2 * | 1/2014 | Grannell et al. .............. 422/129 |
| 2002/0056580 A1 * | 5/2002 | Friebe et al. ................. 180/65.2 |
| 2005/0037244 A1 | 2/2005 | Goetsch et al. |
| 2006/0112636 A1 | 6/2006 | Chellappa et al. |
| 2007/0036707 A1 * | 2/2007 | Dalla Betta et al. ....... 423/418.2 |
| 2011/0293510 A1 | 12/2011 | Grannell et al. |
| 2012/0148925 A1 | 6/2012 | Grannell et al. |

* cited by examiner

AMMONIA FLAME CRACKER SYSTEM, METHOD AND APPARATUS

REFERENCE TO RELATED APPLICATIONS

This application is a continuation-in-part of U.S. patent application Ser. No. 13/117,532, filed May 27, 2011, now abandoned, which claims priority from U.S. Provisional Patent Application Ser. Nos. 61/348,898, filed May 27, 2010 and 61/419,490, filed Dec. 3, 2010, the entire content of each of which is incorporated herein by reference.

FIELD OF THE INVENTION

The present disclosure relates to the operation of embodiments of an ammonia cracker capable of producing a hydrogen gas mixture from ammonia, and more particularly to the operation of an Ammonia Flame Cracker capable of decomposing ammonia into hydrogen and nitrogen, using heat derived from combusting a portion of the ammonia.

BACKGROUND OF THE INVENTION

Due at least in part to high crude oil prices, environmental concerns, and future fuel availability, many internal combustion engine designers have looked to replace crude oil fossil fuels, e.g., gasoline and diesel, with other fuels for powering internal combustions engines. Desirably, by replacing fossil fuels, the cost of fueling internal combustion engines is decreased, harmful environmental pollutants are decreased, and/or the future availability of fuels is increased.

Ammonia is one such fuel capable of at least partially replacing crude oil based fuels. Ammonia ($NH_3$) is widely used in household cleaning supplies and agricultural fertilizer. Unlike either gaseous hydrogen or natural gas, ammonia need not be stored under extreme pressures or at cryogenic temperatures to maintain the ammonia at an energy density which is appropriate for use in propulsion applications such as automobiles and boats. Ammonia may be stored indefinitely as an anhydrous liquid at pressures nearly the same as those of propane, approximately 10 bars at 300 Kelvin. Ammonia has reasonable energy/volume and energy/mass densities, which, although lower as those of gasoline by factors of 2.6 and 2.3, respectively, are still well within reach of practical use in automobiles and other machinery as the principal energy carrier. Accordingly, ammonia may be transported via currently available high pressure pipelines. Ammonia may be made from energy sources, such as nuclear power, which is characterized as having a high concentration of energy production per unit of land surface area. A high concentration of energy production is desirable because the costs, of owning or using land, and maintaining equipment, constitute a significant portion of the total cost of energy production. Nuclear power has a high concentration of energy production which is more than 1000 times greater than the 2-3 kilowatts per hectare gross average rate of liquid fuel production, which is typical for the "biofuels". Therefore, fuel manufacturing, handling, distribution, and use are more feasible for ammonia than for some of the other fuels.

The use of ammonia as an energy carrier makes possible the indirect use of energy obtained from nuclear fission, in mobile applications where direct use would be impractical. In one example, high temperature nuclear reactor heat is used to drive a thermochemical cycle for generating hydrogen, and ammonia is made by combining the hydrogen with nitrogen, obtained by air separation. Hydrogen can be made from high temperature nuclear reactor heat, using the Sulfur-Iodine thermochemical cycle. Ammonia is then made from the hydrogen, using Haber-Bosch ammonia synthesis. A portion of the heat, released by the exothermic formation of ammonia, may be transferred from the Haber-Bosch ammonia synthesis loop to the endothermic hydrogen iodide decomposition process within the Sulfur-Iodine cycle, thereby rendering the combination, of Sulfur-Iodine thermochemical hydrogen production, and Haber-Bosch ammonia synthesis, more efficient for the production of ammonia, than these processes would be if run separately.

In another example, hydrogen is made by high temperature steam electrolysis, using nuclear power to generate the required combination of heat and electricity. Again, ammonia is made from the hydrogen, using Haber-Bosch ammonia synthesis. A presentation, titled "Nuclear-Power Ammonia Production", presented at the 2006 Ammonia Fuel Conference by Kubic, discloses such a system. In the disclosed system, at least a portion of the heat, released by the exothermic formation of ammonia, is transferred from a Haber-Bosch ammonia synthesis loop to a superheater for a high temperature steam electrolysis unit, thereby rendering the combination, of high temperature steam electrolysis, and Haber-Bosch ammonia synthesis, more efficient for the production of ammonia, than these processes would be if run separately. The conversion of nuclear reactor heat to ammonia, by this or a similar system, can be as high as 48% on a higher heating value basis, or 40% on a lower heating value basis. For further reading, see also a presentation, titled "Nuclear Ammonia—a Sustainable Nuclear Renaissance's 'Killer Ap'", presented at the 2011 Ammonia Fuel Conference and authored by Siemer, Sorensen, Hargraves.

Even when natural gas is the chosen primary energy for making ammonia, the conversion, of natural gas to ammonia, may offer some advantages over simply burning the natural gas directly, despite the conversion losses. Some vehicle applications specify the use of liquefied natural gas (LNG). The conversion of natural gas to LNG also involves large energy losses, and LNG requires Dewar tanks and other means of handling, storing and using a cryogen. The use of LNG may also involve significant boil-off and transfer losses, and methane, the principal constituent of natural gas, is a potent greenhouse gas. Means for preventing these losses may be expensive. Also, natural gas and other hydrocarbons can produce carbon monoxide when burned. Therefore, ammonia has value as an engine fuel even when ammonia is made from natural gas. Ammonia is especially valuable for use as a fuel for specialty engines and other appliances which can be safely operated while indoors. A hydrocarbon fueled engine can be run lean or use an exhaust catalyst to avoid carbon monoxide emissions. However, if the air/fuel ratio falls out of adjustment, or if the catalyst becomes nonfunctional, then the hydrocarbon fueled engine may emit dangerously large quantities of carbon monoxide. A diesel engine may emit particulates and malodorous emissions which are unpleasant or hazardous to breathe. Fuel stored as ammonia can be converted to hydrogen, using an Ammonia Flame Cracker. Hydrogen fueled engines, for which the fuel is stored as liquid ammonia, may now be used in applications for which battery/electric was previously the only option, such as forklifts which may be operated indoors. Even barbecuing indoors is feasible with the use of an Ammonia Flame Cracker and appropriate ventilation.

Ammonia can be used as a means of storing and transporting hydrogen for use in other hydrogen-consuming applications disclosed herein or known to the art. In some instances, the costs of transporting hydrogen, and other usability concerns such as tank size and pressure, are sufficient to warrant the purchase of ammonia and the subsequent conversion of ammonia to hydrogen, using an Ammonia Flame Cracker, rather than the purchase of hydrogen as hydrogen.

Like electricity, ammonia is a value-added energy carrier which must be made, with attendant conversion losses, from primary energy. Also like electricity, ammonia can be clean at the point of use, and it can also be made cleanly at the point of manufacture by appropriate choice of primary energy. In some applications, ammonia will be preferred over batteries as the principal means of energy storage, for example, in automobiles and in fishing vessels. Battery/electric systems can be prohibitively expensive and batteries can weigh as much as, or much more, than the rest of the vehicle for an operating range which is currently typical for hydrocarbon fueled vehicles, for example automobiles which are expected to have a range of about 500 kilometers between refueling or recharging. The rechargeable lithium ion battery for a representative electric automobile has a specific capacity of about 53 watt-hours per kilogram for 65% capacity, or 81 watt-hours per kilogram for 100% capacity. If the 197 kilogram battery pack in the representative electric automobile were resealed from a driving range of about 56 kilometers, to a range of 500 kilometers, then the battery pack would have a mass of 1750 kilograms, which is greater than the mass of the rest of the car. Fishing vessels in the 10-20 ton range may carry 4000 liters or more of diesel fuel. For these boats, a rechargeable lithium ion battery would have a mass which is more than 10 times greater than the mass of the rest of the boat, for the same range, according to battery specifications for the representative automobile.

The plant-to-wheels efficiency of an energy chain consisting of, for example, a nuclear reactor equipped with means of making electricity from reactor heat, an electric transmission grid, a battery charger, a battery with attendant charge/discharge losses, and an electric motor with controller (battery/electric) may be either only marginally better or perhaps worse, than the plant-to-wheels efficiency of an energy chain consisting of a nuclear reactor equipped with means of making ammonia from reactor heat, an ammonia distribution network, and an ammonia-fueled internal combustion engine (ammonia/IC engine), the engine possibly incorporating one or more embodiments of the Ammonia Flame Cracker. Even for some cases in which the plant-to-wheels efficiency of battery/electric is substantially greater than the plant-to-wheels efficiency of ammonia/IC engine, ammonia/IC engine may still be preferred due to higher energy storage density, longer range, and lower total cost as compared to battery/electric.

The "yellow coal" limit is the lower bound on the concentration of a fissionable element in rock deemed feasible for mining, such that the mass of rock at the yellow coal limit which must be handled is equal to the mass of coal which must be handled for the same gross energy yield. The "yellow coal" term has been applied to uranium (yellow cake, hence yellow coal), and for the enriched uranium/once through fuel cycle the yellow coal limit is about 70 parts per million (ppm) by weight of natural uranium in rock. Calculations done for thorium fueled breeder reactors indicate a yellow coal limit of about 0.4 ppm by weight of thorium, which is much lower than the estimated 6-12 ppm average concentration of thorium in the earth's crust. Hence the potentially recoverable reserves of primary energy, including thorium, which can be used to cleanly make both ammonia and electricity, are much, much greater than reserves of coal, oil and natural gas combined.

The inventors' U.S. application Ser. No. 12/947,137, filed Nov. 16, 2010, now document number 20110114069, the text and drawings of which are hereby incorporated by reference in its entirety, describe the use of ammonia with oxygen as a combustion promoter to fuel an engine. The inventors' U.S. Pat. No. 7,574,993, the text and drawings of which are hereby incorporated by reference in its entirety, describes the use of ammonia with another fuel for fueling an engine, wherein the other fuel is a combustion promoter. In some cases the combustion promoter was another fuel stored separately from the ammonia. In other cases the combustion promoter was hydrogen. Desirably, the combustion promoter may be derived by using an ammonia cracker to decompose at least a portion of the ammonia into hydrogen and nitrogen, thus enabling engine operation with pure liquid anhydrous ammonia as the only stored fuel.

Ammonia crackers known to the art have difficulties and limitations because of large size and intricate design required for heat transfer, large quantities of sometimes expensive catalyst required to obtain a substantial ammonia decomposition yield, an uncontrolled and often low ammonia decomposition yield, and lack of rapid start capability. Ammonia crackers designed to use engine exhaust heat to decompose ammonia, such as the ammonia crackers disclosed in U.S. Pat. Nos. 2,140,254, 4,478,177, and 4,750,453, are often large, expensive, and intricate devices which must be placed in the engine exhaust flow. Furthermore, an engine's exhaust gas temperature is generally not high enough to decompose any of the ammonia without using an ammonia cracker catalyst. Such cracker catalysts may be large and expensive when sized for providing enough catalytic sites for catalytically decomposing ammonia at a high rate or high decomposition yield. In some instances, an engine's exhaust gas temperature may not be high enough to give acceptable ammonia cracker performance even with the use of a catalyst.

The equilibrium constant determines the maximum possible extent of ammonia decomposition at a given pressure and temperature. The equilibrium constant favors a lower content of ammonia in the mixture, with increasing temperature. The higher temperatures, required for non-catalyzed ammonia decomposition, give a much lower possible concentration of ammonia in a decomposed mixture, than is possible at temperatures at which ammonia cracker catalysts are typically designed to work.

Ammonia crackers may be designed to use electricity to decompose ammonia at high temperatures, including temperatures at which ammonia will decompose rapidly and at a high decomposition yield without the aid of a catalyst (hereafter referred to as the "ammonia cracking temperature"). Examples include electrically heated ammonia crackers disclosed in U.S. Pat. Nos. 1,915,120, 2,013,652, 2,161,746, 2,264,693, 3,025,145, 3,379,507, and 3,598,538. For this discussion the class of electrically powered ammonia decomposers is broadened beyond ammonia crackers using resistively heated elements, to include ammonia decomposers which use electric arcs, electromagnetic energy such as microwaves, or electrolysis to decompose ammonia into hydrogen and nitrogen. However, the conversion of fuel energy into electricity, by an engine system, involves losses in the engine and losses in the generator. Electricity is thus, joule for joule, more costly to use for decomposing ammonia, than is heat obtained by combusting a portion of the ammonia. Some of the Ammonia Flame Cracker (capitalized hereafter and elsewhere to distinguish the present invention from the prior art) embodiments disclosed herein are intended to obtain energy for decomposing ammonia principally from the combustion of some of the ammonia and not from electricity. Therefore, an engine system, incorporating one of the Ammonia Flame Cracker embodiments disclosed herein, will be somewhat more efficient than an otherwise similar engine system incorporating an electrically powered ammonia decomposer.

Even for non-engine applications, it may be preferred to obtain the heat, required to decompose ammonia, by combustion of a portion of the ammonia, rather than by electrical heating, because, in some instances, electricity may be more expensive than ammonia, and also because electrical heating may require an electrical hookup of very substantial capacity at the ammonia cracker, whereas ammonia combustion does not. Furthermore, some applications may be remote. Other applications may be air-born, for example, carried on board balloons, and for these applications the use of very substantial quantities electrical energy may be forbidden.

In some applications, an Ammonia Flame Cracker may be incorporated into an auxiliary system representing only a small fraction of the total energy consumption. Examples include using an Ammonia Flame Cracker to supply hydrogen to an exhaust emissions control device or system, such as one incorporating a hydrogen-SCR (selective catalytic reduction) unit. In these applications, it may be feasible to use electric heating as at least a partial heat input for bringing ammonia up to the ammonia cracking temperature, or for maintaining an Ammonia Flame Cracker at a suitable operating temperature during periods of intermittent cessation or reduction of flow. However, even if electricity is used as at least a partial heat input for bringing ammonia up to the ammonia cracking temperature, it is still both desirable, and an object of the present invention, to derive at least a portion of energy, required to decompose ammonia, by combustion of some of the ammonia. An internal release of heat, at the ammonia cracking temperature, facilitates the gaseous phase decomposition of ammonia in bulk. Once started, the decomposition of ammonia proceeds without additional external application of heat to the gas, and in some cases, without the aid of a catalyst.

Hot filaments, for example glow plugs and the like, are known to the art and may be used for igniting ammonia within a combustion chamber of a piston engine. However, such a filament may prematurely ignite a homogeneous, premixed fuel/air charge, and a large pumping loss would occur if a piston engine were to include a provision for preventing contact between a premixed fuel/air charge and the filament during compression, and another provision for passing the entire charge through the filament region, within a short crank angle duration, when the piston is near top center. The implementation of these provisions within a combustion chamber of a piston engine or other engine with discrete firing cycles is also difficult, burdensome and expensive. Glow plugs are thus unsuitable for use in premixed charge engines with discrete firing cycles. Glow plugs which are used for igniting ammonia are not intended to substantially fully decompose an entire ammonia stream into a hydrogen-containing product mixture, which is destined for combustion or other use elsewhere. Glow plugs are also not generally controlled to operate at a particular local ammonia/air equivalence ratio, and the filament in a glow plug may have a short service life because the adiabatic flame temperature is far in excess of the melting temperature of most common metals when the ammonia/air equivalence ratio is near stoichiometric, as is the case for combusting ammonia and other fuels with air in an engine. "Normal air" (or simply "air") is defined herein as the natural atmospheric mix of mostly nitrogen and oxygen, which is neither enriched nor depleted in oxygen content.

Ammonia burners, disclosed in U.S. Pat. No. 5,904,910, can combust ammonia with pure oxygen or oxygen-enriched air, or combust ammonia with other fuels and air, or combust ammonia with hydrogen obtained by earlier rich ammonia combustion with oxygen or oxygen-enriched air or with other fuels and air. However, the burners disclosed in U.S. Pat. No. 5,904,910 would not be operable to combust a very rich, homogeneous mixture containing ammonia and oxygen at an equivalence ratio which is richer than the upper flammability limit for ammonia in mixture, without first raising the mixture temperature to the ammonia cracking temperature, and according to specifications, these burners achieve peak temperatures by first combusting the mixture. Some embodiments of the disclosed Ammonia Flame Cracker are operable to decompose ammonia in a single step, using ammonia and normal air as the only inputs, wherein the ammonia/air equivalence ratio is generally much richer than the upper flammability limit for ammonia in air.

Some of the ammonia burners, disclosed in U.S. Pat. No. 5,904,910, can combust ammonia with pure oxygen or oxygen-enriched air. However, the schematic appears to show that ammonia is mixed with an oxygen-containing gas before reaching the burner. The benefits of using a mixing burner, or other burner with separate ammonia and oxygen inputs, are not disclosed in U.S. Pat. No. 5,904,910. The upper flammable limit of ammonia fully premixed in pure oxygen is about 79% ammonia by volume, which corresponds to an ammonia/oxygen equivalence ratio of 2.82. Separate metering of ammonia and oxygen into a mixing burner enables sustained, non-catalytic combustion of ammonia with oxygen at equivalence ratios much greater than 3, thus extending the flammable limits far beyond those possible with a homogeneous mixture. This flammability limit extension can be used to great advantage for decomposing ammonia during warmed up operation of Ammonia Flame Crackers, and also for starting. The benefit of counterflow heat exchanging of the inputs and output of the burner, immediately before the gas is used for anything else, is also not disclosed in U.S. Pat. No. 5,904,910. Heat exchange can be used for obtaining a full ammonia decomposition yield at a higher range of equivalence ratios, thus raising the ammonia-to-hydrogen conversion efficiency. The separate metering, of ammonia and oxygen streams into a mixing burner, enables sustained non-catalytic ammonia combustion and decomposition at equivalence ratios greater than 3, and heat exchange, of the inputs and output of the mixing burner, enables a full ammonia decomposition yield at these equivalence ratios.

U.S. Pat. No. 2,013,809 discloses an ammonia cracker, which decomposes ammonia on a catalyst, which is heated by combustion of products of ammonia decomposition, and at an unspecified ammonia decomposition temperature. U.S. Pat. Nos. 2,601,221 and 2,606,875 describe catalytic ammonia combustion and/or decomposition at temperatures of 500° C. or higher, but these do not further disclose the substantially non-catalyzed combustion and decomposition of ammonia, which occurs at temperatures higher than 1100° C. Other ammonia crackers, such as those disclosed in U.S. Pat. Nos. 2,578,193, 3,505,027, 4,069,071, 4,157,270, 4,179,407, 4,219,528, 5,055,282, 5,139,756, 5,976,723, 6,007,699 and 6,800,386 operate at peak temperatures of 1100° C. or lower, at which the non-catalyzed decomposition of ammonia will not occur at an appreciably high rate. Embodiments of the disclosed Ammonia Flame Cracker are operable to decompose ammonia at a high rate, at peak temperatures which are generally higher than 1100° C., and in a manner which is either substantially or fully non-catalytic.

Systems incorporating ammonia burners and cracker catalysts are disclosed in U.S. Pat. Nos. 4,788,004 and 6,936,363. These systems decompose ammonia on a cracker catalyst, and then combust at least a portion of the decomposed ammonia or other fuels in a burner, which may or may not be catalytic, yielding heat which is used for decomposing more ammonia on the cracker catalyst. However, the systems, disclosed in U.S. Pat. Nos. 4,788,004 and 6,936,363, operate at peak temperatures of about 750° C., at which non-catalyzed decomposition of ammonia will not occur appreciably, thus the cracker catalyst must be sized for catalyzing all of the ammonia decomposition reactions. Some embodiments of the Ammonia Flame Cracker incorporate a catalyst, nevertheless these embodiments are intended to decompose ammonia at peak temperatures higher than 1100° C., at which most of the ammonia decomposes non-catalytically and at a high rate, thus the catalyst need be sized only for starting the reactions and not for catalyzing all of the reactions. Other embodiments of the disclosed Ammonia Flame Cracker are operable without the use of any catalyst. Operation of an Ammonia Flame Cracker without a catalyst is advantageous because some catalysts are expensive, and also because some catalysts may not be durable at temperatures at which ammonia rapidly decomposes non-catalytically.

Systems incorporating endothermic reaction loops heated by exothermic reaction loops are disclosed in U.S. Pat. No. 6,096,106. In basic structure, some of these are very similar to some embodiments of the Ammonia Flame Cracker 600, wherein ammonia or products of ammonia decomposition are combusted in a first exothermic loop and ammonia is decomposed in a second endothermic loop, and a heat exchange relationship exists between the first and second loops. However, the intent of the systems disclosed in U.S. Pat. No. 6,096,106 is the reformation of natural gas or other hydrocarbons, and not the decomposition of ammonia.

Work on cracking ammonia was reported by Lee, Park, and Kwon at the 2008 Ammonia Fuel Conference. The 2008 presentation, delivered on Sep. 29, 2008, is titled "Properties of Laminar Premixed Hydrogen-Added Ammonia/Air Flames". Additional work on cracking ammonia was reported by Kwon, Too, Lee, and Um at the 2011 Ammonia Fuel Conference. The 2011 presentation, delivered on Sep. 19, 2011, is titled "Reforming and Burning of Ammonia in Micro Hydrogen and Power Generation Systems". The combined combustor/reformers, shown in these two presentations, appear similar to Ammonia Flame Cracker 600, which has separate ammonia combustion and decomposition loops. However, neither of these two presentations specifies a temperature range for non-catalyzed ammonia decomposition. In particular, no specification is given for the use of temperatures higher than 1100° C. for non-catalyzed decomposition of ammonia.

Based on the foregoing, there is a need for a rapid-starting device for decomposing ammonia into a hydrogen-containing product mixture, said device being characterized as compact and capable of decomposing ammonia at a high decomposition yield, at a high overall thermal conversion efficiency, and at a high throughput rate, using ammonia and normal air as the only inputs, and using very little or no catalyst.

SUMMARY OF THE INVENTION

This invention broadly relates to the decomposition of ammonia into a hydrogen gas mixture. A method of cracking gaseous ammonia in accordance with the invention comprises flowing a premixed, ammonia-rich gaseous mixture of anhydrous ammonia and air into the inlet of a conduit. Combustion and decomposition of a portion of the mixture is initiated within the conduit, thereby liberating heat and hydrogen. The hydrogen mixes with the bulk of the gas mixture and the liberated heat drives the combustion reaction to completion, including portions of the gas not associated with the initial combustion and decomposition process. A mixture of gaseous products resulting from the reaction is expelled from the outlet of the conduit, the mixture including non-combusted hydrogen gas, which may then be used for other purposes.

In one embodiment, combustion and decomposition of a portion of the mixture is initiated with a heating element disposed within the conduit. The initial combustion and decomposition results from a portion the gaseous mixture making contact with the heating element. The heating element may be a filament or set of filaments, one or more ribbons, a screen or set of screens, metal foam, a coating, or other geometry or combination of geometries. The heating element is constructed from one or more of the following elements or compounds: carbon, silicon, silicon carbide, molybdenum, molybdenum disilicide, iron, cobalt, nickel, chromium, rhenium, and a platinum-group metal. The dimensions and/or geometry of the heating element may be chosen so as to initiate flamelets of combustion on a sufficiently wide distribution of points that the respective flamelets traverse the burning gas mixture before it travels appreciably far from the region immediately adjacent the element.

The decomposition of the ammonia occurs substantially within the gaseous phase and at a temperature high enough for rapid and substantially non-catalyzed decomposition of the mixture in bulk. The mixture of gases from the outlet of the conduit may contain up to about one half hydrogen by volume. The hydrogen may be used as a combustion promoter after exiting the conduit and/or as fuel for an internal combustion engine, furnace or cooking appliance.

The ammonia/air mixture may have an equivalence ratio substantially above the normal rich flammability limit for ammonia in air. Materials in contact with the ammonia/air mixture in regions upstream of the element may be selected or treated so as to be substantially devoid of catalytic activity for either decomposing or combusting ammonia.

In accordance with one embodiment, the heating element is an electrically powered resistive element. The heating element's electric power may be turned off or turned down to a nominal level during fully warmed up operation, and wherein the heat required to keep the heating element at the ammonia cracking temperature and to decompose ammonia is substantially derived from the combustion of some of the ammonia.

The temperature of the heating element may be monitored by measuring the resistance of the element or by measuring the thermal radiation of the element, with the electric power applied to the heating element being controlled to maintain at least a particular heating element temperature. The ammonia/air equivalence ratio may also be controlled as a function of measured temperature. At least a portion the sensible heat of the outbound hydrogen gas mixture may be recuperated into the incoming ammonia/air mixture in a counterflow heat exchanger, thereby extending the range of equivalence ratios for which full ammonia decomposition yield is obtained, and improving the ammonia-to-hydrogen thermal conversion efficiency. A concurrent heat exchanger could be used, but the theoretical limit of heat recovery for concurrent flow is only about half of the theoretical limit of heat recovery for counterflow. Also, an Ammonia Flame Cracker, incorporating counterflow heat exchange immediately into and out of the reaction zone, is easier to build than an Ammonia Flame Cracker, incorporating concurrent flow.

An ammonia flame cracker apparatus or system constructed in accordance with the invention includes a conduit having an inlet for receiving an ammonia-rich gaseous mixture containing anhydrous ammonia and oxygen. A heating element disposed within the conduit exhibits at least nominal catalytic activity sufficient to initiate combustion and decomposition of the mixture in contact with the element, thereby liberating sufficient heat and hydrogen to drive the combustion reaction to completion in portions of the mixture not in contact with the heating element. The outlet of the conduit expels a mixture of gases resulting from the reaction, the mixture preferably including excess non-combusted hydrogen gas.

DETAILED DESCRIPTION OF THE PREFERRED EMBODIMENTS

Figure 1:
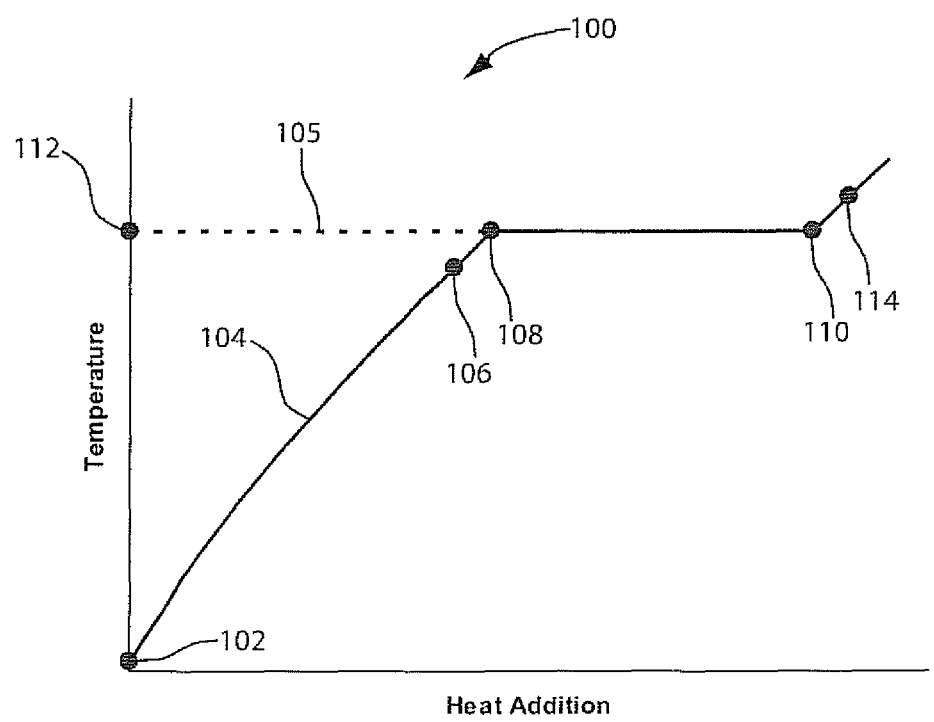
FIG. 1 is a graph showing the basic features of a trajectory taken by ammonia or an ammonia-containing gas mixture during heat addition to the gas.

Described herein are apparatus, systems and methods for decomposing ammonia into a hydrogen-containing product mixture. The invention is compact and capable of decomposing ammonia at a high decomposition yield, at a high overall thermal conversion efficiency, and at a high throughput rate, using ammonia and normal air as the only inputs, and using very little or no catalyst. A rich mixture of ammonia and air undergoes an avalanche of water formation and ammonia decomposition reactions when a temperature is reached, at which ammonia decomposes non-catalytically. The decomposition of ammonia thus occurs substantially within the gas phase, and in some cases, without the aid of any catalyst.

A heat exchanger permits the use of reaction temperatures in excess of 1100° C. without an energy penalty because most of the sensible heat in the outgoing product mixture can be recuperated into the incoming reactant mixture, and in some cases, this heat recuperation causes the mixture to begin to react. The resulting hydrogen gas mixture may contain up to about one half hydrogen by volume and may be used to fuel an engine for which ammonia is the only stored fuel, to fuel a burner such as in a furnace or in an outdoor cooking appliance, for various applications requiring the use of a hydrogen/nitrogen "form gas" mixture, for supplying a hydrogen-SCR or other exhaust emissions control device, or the hydrogen may be purified by means known to the art for use in other applications, such as a lift gas for a balloon, or storage for later sale.

In one embodiment, combustion of a premixed ammonia-rich ammonia and air mixture is initiated on a reactive element of materials chosen for at least nominal catalytic activity, for withstanding the peak temperature and chemical environment, and, in some instances, for appropriate electrical resistivity. The reactive element may be a filament or set of filaments, one or more ribbons, a screen or set of screens, metal foam, a coating, a ceramic/catalyst wash coat mixture, or some other geometry or combination of geometries, but hereafter the reactive element will be referred to as a "catalyst". Examples of functional catalyst materials include, but are not limited to: nichrome, nichrome coated with nickel, nickel, stainless steel, and nichrome coated with platinum. Even copper shows substantial catalytic activity for decomposing ammonia. Platinum or rhodium may be used for imparting corrosion resistance to a functional catalyst alloy also containing ruthenium, rhenium, osmium, or iridium.

It was found that catalysts of pure nickel or nichrome corrode at an appreciable rate during operation of an Ammonia Flame Cracker. These, and other metals of a similar melting temperature near 1400° C., have a small margin between the catalyst melting temperature and the ammonia cracking temperature. Generally, it was found that heat exchanged, premixed Ammonia Flame Crackers, incorporating nichrome catalysts, can be operated for an hour or more at a high throughput and at a high ammonia decomposition yield without melting the nichrome. Therefore, it appears that the ammonia cracking temperature is lower than 1400° C. for a broad range of throughput. This result was confirmed by thermocouple measurements of rich ammonia/oxygen flames, indicating a cracking temperature of 1200-1250° C. Ammonia begins to decompose in a silicon carbide tube when the wall temperature reaches about 1300° C., and this temperature threshold was measured with an optical pyrometer. Other alloys with greater corrosion resistance and melting temperatures of 1500° C. or higher may be used as catalysts toward the advantage of increased durability and for a wider margin between the catalyst melting temperature and the ammonia cracking temperature. Examples of such catalyst materials may include, but are not limited to, alloys of chromium and rhenium or platinum-group metals, or chromium with a platinum-group metal coating, or a doped semiconductor and/or ceramic such as silicon carbide, coated with a very small quantity of a rhenium-containing metal or a platinum-group metal. Some Ammonia Flame Cracker embodiments incorporating catalysts may be heat exchanged toward the advantage of obtaining a full ammonia decomposition yield at a higher range of ammonia/air equivalence ratios.

In some embodiments a continuously flowing, premixed ammonia-rich ammonia/air mixture is brought up to the ammonia cracking temperature in a heat exchanger. A relatively small amount of hydrogen is produced within the mixture when the ammonia begins to decompose. The hydrogen then autoignites, and the mixture combusts and at least a portion of the ammonia decomposes without the use of any catalysts, thus the cracking can be initiated and completed fully non-catalytically. The heat exchanger then transfers at least a portion of the outgoing hydrogen-containing product mixture's sensible heat into the incoming ammonia/air mixture. The heat released by the formation of water maintains at least a portion of the heat exchanger at temperatures equaling or exceeding the ammonia cracking temperature, and the heat released by the formation of water is used to decompose at least a portion of the ammonia into hydrogen and nitrogen.

Ammonia Flame Cracker embodiments which are functional without a catalyst are advantageous because catalyst cost is omitted, catalyst durability may otherwise be a problem at the ammonia cracking temperature, and also the engineering requirements for catalyst placement are relaxed. Even "platinum-group" metals, which include ruthenium, rhodium, palladium, osmium, iridium and platinum, may slowly corrode, evaporate, sinter or otherwise degrade, or migrate downstream at the ammonia cracking temperature.

Contamination of SCR catalysts by this migration can be avoided by selecting an Ammonia Flame Cracker catalyst metal which is the same as the SCR catalyst metal. For example, if an SCR unit incorporates ruthenium, then the Ammonia Flame Cracker may also use ruthenium for the catalyst, such that the possible migration, of small quantities of additional ruthenium from the Ammonia Flame Cracker to the SCR unit, will not adversely affect the SCR unit. A catalyst vapor pressure of less than one ten-billionth of an atmosphere was estimated to result in the evaporation of less than one tenth of a gram of the catalyst during a service life which is expected for use of an Ammonia Flame Cracker for fueling an automobile engine. Rhodium, platinum, ruthenium, iridium, and rhenium have a vapor pressure of about one ten-billionth of an atmosphere at 1361° C., 1386° C., 1598° C., 1676° C., and 2062° C., respectively. The relatively high vapor pressure of palladium and the volatility of osmium oxides may make palladium and osmium unsuitable as unalloyed catalysts for Ammonia Flame Crackers. Ruthenium and iridium have a relatively high activity for decomposing ammonia. Rhenium resists corrosion even in the presence of oxygen at high temperatures. Platinum and rhodium are also very corrosion resistant at high temperatures.

In some embodiments ammonia and an oxygen-containing gas air enter a heat exchanger and are preheated separately until they reach a combustion zone, at which point the ammonia and oxygen-containing gas mix and combust. The ammonia and oxygen-containing gas may be preheated to temperatures possibly exceeding the ammonia cracking temperature prior to mixing and combustion. If the oxygen-containing gas is substantially pure oxygen, then a mixing burner will support a very high flame speed for a wide range of preheat temperatures, including ambient temperature, and also for a practically infinite range of total ammonia/oxygen equivalence ratios. The combusted mixture, preferably containing non-combusted hydrogen gas, is then counterflow heat exchanged with the incoming ammonia and oxygen-containing gas.

In some embodiments a continuously flowing, premixed lean or stoichiometric ammonia/air mixture is combusted within a first exothermic loop of a heat exchanger, and ammonia is at least partially decomposed into hydrogen and nitrogen within a second endothermic loop of the same heat exchanger. The ammonia/air mixture entering the first loop is brought up to the ammonia cracking temperature, at which point it combusts and releases heat without the aid of a catalyst. The ammonia entering the second loop is raised to the ammonia cracking temperature and the ammonia is at least partially decomposed into hydrogen and nitrogen. Then the outgoing combusted products in the first loop and outgoing cracked mixture in the second loop are heat exchanged with the incoming ammonia/air mixture in the first loop and incoming ammonia in the second loop. The combusted products exiting from the first loop may then be discarded or used elsewhere. These embodiments may be operated toward the advantage of obtaining a hydrogen gas mixture which is devoid of water and also of reduced nitrogen content.

In some embodiments a fuel gas is combusted with air within a first exothermic loop of a heat exchanger, and ammonia is at least partially decomposed into hydrogen and nitrogen within a second endothermic loop of the same heat exchanger. The fuel gas and air enter the first loop and are preheated separately until they reach a combustion zone, at which point the fuel gas and air mix and combust. The fuel gas/air mixing may be done in a distributed way, such that combustion and heat exchange processes are spread out, thus lowering peak surface temperatures as required to maintain the heat exchanger materials within the durability limit. The fuel gas and air are kept separate until reaching a combustion zone because in some instances, for example a fuel gas containing hydrogen, a premixed fuel gas/air mixture will autoignite at a temperature which is substantially lower than the ammonia cracking temperature, thus releasing a portion of heat through a temperature range which is lower than the ammonia cracking temperature, which would lower the overall efficiency of the ammonia cracker. Even when the fuel gas is ammonia, a near-stoichiometric ammonia/air mixture may autoignite at a temperature which is lower than the ammonia cracking temperature. A near-stoichiometric ammonia/air mixture has a non-catalyzed autoignition temperature of about 850° C. It may be advantageous to keep the fuel gas and air separate and then combine them in a distributed combustion zone, because the distribution of combustion gives positive control of the exact location and distribution of the heat released by combustion. The fuel gas and air may be preheated separately to temperatures possibly exceeding the ammonia cracking temperature prior to mixing and combustion. The ammonia entering the second loop is raised to the ammonia cracking temperature and the ammonia is at least partially decomposed into hydrogen and nitrogen. Then the outgoing combusted products in the first loop and outgoing cracked mixture in the second loop are heat exchanged with the incoming separate fuel gas and air in the first loop and incoming ammonia in the second loop. The combusted products exiting from the first loop are discarded or used elsewhere, and the hydrogen-containing gas mixture exiting from the second loop is used for any of the various applications disclosed herein. Embodiments, containing separate loops for combustion of a fuel gas and cracking of ammonia, may also be operated toward the advantage of obtaining a hydrogen gas mixture which is devoid of water and also of reduced nitrogen content. Furthermore, these embodiments may be used to operate a fuel cell. The hydrogen gas mixture exiting from the second loop flows through the fuel cell, wherein hydrogen is consumed and the hydrogen gas mixture becomes depleted of hydrogen content. The depleted hydrogen gas mixture is purged from the fuel cell, and any hydrogen or other fuel left over in the depleted mixture is combusted in the first loop of the heat exchanger. Total gas flow and hydrogen consumption by the fuel cell may be controlled such that the chemical energy content of the depleted hydrogen gas mixture entering the first exothermic loop of the heat exchanger is sufficient to fully decompose the ammonia entering the second endothermic loop of the heat exchanger.

Embodiments of the Ammonia Flame Cracker may be started by electrical resistive heating of the catalyst and/or portions of the heat exchanger. In some instances, the quantity of electrical energy involved in starting an Ammonia Flame Cracker may be large, or a long startup delay may be involved when electricity is used to start an Ammonia Flame Cracker.

Embodiments of the Ammonia Flame Cracker may be started by combusting a near-stoichiometric mixture of ammonia and air to supply the heat required for quickly bringing portions of the Ammonia Flame Cracker up to operating temperature. The ammonia/air mixture does not readily support flame propagation under ordinary conditions, but it can be ignited continuously by passage through an electric arc of sufficient intensity and distribution. The ammonia/air mixture thus acts as an energy multiplier which reduces the electrical energy requirement for starting the Ammonia Flame Cracker. It was observed that an energy multiplication factor of at least 3 can readily be obtained by passing a near-stoichiometric ammonia/air mixture through a rotating electric arc. Very high multiplication factors of at least 10 can be obtained by passing a rich ammonia/air mixture over a catalyst. The mixture combusts and decomposes, and additional air can be introduced downstream of the catalyst to burn the leftover hydrogen for additional heat. Electrical energy is required only to bring the catalyst up to a catalytic light off temperature. The "catalytic light-off temperature" is the minimum temperature at which a given catalyst will display substantial activity for catalytically combusting or decomposing ammonia. Additional electric power may be supplied to portions of the catalyst at nominal power levels to ensure the stability of the catalyst's temperature and catalytic activity profile. Heat, which is released by both the ammonia/air combustion and the electric power, is distributed to the Ammonia Flame Cracker by flowing of the hot combusted mixture over surfaces within the Ammonia Flame Cracker, preferably beginning with the surfaces of highest operating temperature.

Embodiments of the Ammonia Flame Cracker may be started by combustion of a starter fuel, other than ammonia, to supply the heat required for quickly bringing portions of the Ammonia Flame Cracker up to operating temperature. Heat, which is released by combustion of the starter fuel, is distributed to the Ammonia Flame Cracker by flowing of the hot combusted mixture over surfaces within the Ammonia Flame Cracker, preferably beginning with the surfaces of highest operating temperature. Examples of starter fuels may include a hydrogen gas mixture which was obtained and stored during previous operation of the Ammonia Flame Cracker, or other fuels such as propane which are stored separately from the ammonia. At startup, an engine or other combustion apparatus may be started and run immediately on the starter fuel until the Ammonia Flame Cracker becomes operational, at which point the engine or other combustion apparatus ceases use of the starter fuel and begins use of the Ammonia Flame Cracker output. However, the use of other fuels such as propane at startup, although feasible, negates the intent of using ammonia as the only fuel. To the extent that flammability limits permit, the starter fuel may be used with a portion of ammonia for both running the engine and for heating the Ammonia Flame Cracker, thus reducing the quantity of starter fuel consumed during startup.

Embodiments of the Ammonia Flame Cracker may be started by combusting a substantially rich mixture of ammonia and a substantially pure oxidizer to supply the heat required for quickly bringing portions of the Ammonia Flame Cracker up to operating temperature. Examples of such oxidizers include molecular oxygen, nitrogen dioxide, nitric oxide, nitrous oxide, and hydrogen peroxide. Oxygen can be stored as a high pressure gas or it can be obtained by extraction from air, using one of many air separators known to the art. Many engines are equipped with air compressors. Oxygen can be easily obtained by pressure swing adsorption when compressed air is available. Nitrogen dioxide, nitrous oxide and hydrogen peroxide can readily be stored as liquids in quantities sufficient for hundreds of starts. Nitrous oxide is relatively nontoxic, and has a low freezing point.

At 25° C., a homogeneously premixed, rich mixture of ammonia and pure oxygen readily supports non-catalyzed flame propagation and it has an adiabatic flame temperature exceeding the ammonia cracking temperature when the ammonia/oxygen equivalence ratio is less than about 2.4. Even without preheating, the ammonia/oxygen mixture is flammable, and it makes a combustible hydrogen-containing gas mixture when it reacts. If the ammonia and oxygen are instead metered separately into a combustion zone, for example as is done in a mixing burner, then even an overall very rich ammonia/oxygen mixture will have a very high flame speed in regions of near-stoichiometric mixing. Near-stoichiometric mixing occurs near the mixing interface, in regions where the oxygen and ammonia are not yet fully mixed. Separate metering, of the ammonia and oxygen components of the starting mixture, thus permits selection of equivalence ratio according to a desired flame temperature and ammonia decomposition yield, and this arrangement will support a very high throughput of the starting mixture without blowing out the flame. In some cases, separate metering, of ammonia and oxygen, permits a broader range of throughput of the starting mixture, without blowing out the flame, and without flashing back, than is possible with a fully premixed ammonia/oxygen mixture. Partial premixing of an ammonia/oxygen mixture may also be used in order to facilitate mixing, while retaining all of the advantages of separate metering of ammonia and oxygen. In partial premixing, some of the oxygen is premixed with the ammonia, and the remainder of the oxygen is metered separately into the mixing burner. Preferably, the premixed ammonia/oxygen portion should be sufficiently rich so as to avoid flashing back.

Heat, which is released by the ammonia/oxygen combustion, is distributed to the Ammonia Flame Cracker by flowing of the hot combusted mixture over surfaces within the Ammonia Flame Cracker, preferably beginning with the surfaces of highest operating temperature. A portion of the heat released by combustion of the ammonia/oxygen mixture also goes into non-catalytically decomposing at least a portion of the excess ammonia into hydrogen and nitrogen. The combusted mixture thus contains a substantial hydrogen fraction and it may be used to run an engine or other hydrogen-consuming apparatus. The use of oxygen or other pure oxidizers thus permits instant starting and running of an engine or other hydrogen-consuming apparatus while the Ammonia Flame Cracker is warming up, without using fuels other than ammonia. During a startup period, an engine or other hydrogen-consuming apparatus may be started and run on the hydrogen gas mixture produced by the combustion of the rich ammonia/oxidizer starting mixture until the Ammonia Flame Cracker reaches an operational state, at which time the oxidizer flow ceases and the Ammonia Flame Cracker begins to use air for producing the hydrogen gas mixture from ammonia. Oxygen can be stored in a high pressure bottle in quantities sufficient for many starts, or it can stored in smaller quantities sufficient for one or several starts, and then replenished after starting by use of means known to the art for extracting oxygen from air, for example, a pressure swing adsorption unit. If substantially pure oxygen is not used during fully warmed-up operation of the Ammonia Flame Cracker, then the oxygen extractor needs only to be designed for replenishing a starting charge within a reasonable running time, for example, a minute. Revival from a dead start condition, wherein the supply of oxygen is exhausted, can be effected by operating the oxygen extractor to replenish the starter oxygen before making a starting attempt. The "jump starting" of an ammonia-fueled vehicle with a dead battery and an exhausted oxygen supply thus requires only the usual electrical connection that a gasoline fueled vehicle with a dead battery would also require.

In some embodiments of the Ammonia Flame Cracker, at least a portion of the oxygen in an oxygen-containing gas and a portion of the ammonia are combusted, and at least a substantial portion of the remaining ammonia is decomposed into hydrogen and nitrogen. Typically, the oxygen-containing gas is normal air which is neither enriched nor depleted in oxygen content. The disclosed embodiments of the Ammonia Flame Cracker are thus generally operable with ammonia and air as the only inputs, and without the use of air separating equipment, although the use of substantially pure oxygen can be usefully incorporated into an Ammonia Flame Cracker's startup strategy. The total ammonia/air reaction is described by the following equation:

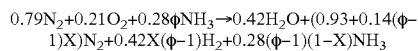

$\phi$=ammonia/air equivalence ratio, and $\phi > 1$
$X$=decomposition yield of the non-combusted ammonia portion, and $0 \le X \le 1$ The resulting gas mixture containing hydrogen can be used to fuel an engine for which ammonia is the only stored fuel, to fuel a burner such as in a furnace or in a cooking appliance, or for various applications requiring the use of a hydrogen/nitrogen "form gas" mixture, or for other applications disclosed herein or known to the art. The disclosed Ammonia Flame Cracker also enables the use of ammonia as a hydrogen distribution medium. Hydrogen can be made into ammonia at a hydrogen production site. The hydrogen can then be stored and distributed as ammonia, and when desired, an Ammonia Flame Cracker can be used to reconstitute the hydrogen, in some cases at a high purity level by gas separation means known to the art.

An Ammonia Flame Cracker can be incorporated into a device for providing a hydrogen lift gas for a balloon. Ammonia has high hydrogen content and in some cases it is simpler and less expensive to obtain hydrogen by decomposing ammonia, which can be done non-catalytically and in a single step, than to obtain hydrogen by reforming alcohols or hydrocarbons.

An Ammonia Flame Cracker can be incorporated into an emissions control system. Selective Catalytic Reduction (SCR) units are used for removing $NO_x$ from engine exhaust. SCR units remove $NO_x$ by using reducing agents (reductants), such as hydrogen or ammonia, to transform $NO_x$ into nitrogen. SCR units, which are designed for using hydrogen, are advantageous because a slight excess of the reductant can be used for full suppression of $NO_x$ without causing ammonia to pass through the SCR catalyst. Therefore, a more favorable operating characteristic is achieved, resulting in one or more of the following: greater $NO_x$ cleanup efficiency, lower ammonia emissions, higher engine efficiency, higher maximum engine power, elimination of the need for exhaust gas recirculation, elimination of the need for lean-rich cycling of the engine, the absence of catalyst plugging due to deposits formed by reactions involving ammonia, elimination of the need for a $NO_x$ trap, or reduced SCR catalyst size, when hydrogen is the reductant.

An Ammonia Flame Cracker can be used for supplying hydrogen to an SCR unit. The reductant is stored as ammonia, and an Ammonia Flame Cracker converts the ammonia to a hydrogen-containing gas mixture, which is then mixed with the exhaust gases, and then the mixture of hydrogen and exhaust gas is flowed through the SCR catalyst. This use of ammonia, as described, eliminates the complications of using urea/water mixtures. Urea/water mixtures freeze at −11 Celsius, and carbon may be deposited when the urea decomposes. The conversion of ammonia to a hydrogen-containing product mixture, in an Ammonia Flame Cracker, also substantially eliminates the passage of ammonia through an SCR catalyst if the Ammonia Flame Cracker is designed or controlled to give a high ammonia decomposition yield. The hydrogen-containing product mixture may be used as an SCR reductant without removing the water or otherwise purifying the hydrogen.

The conversion of ammonia to hydrogen for SCR also eliminates the need to obtain hydrogen by reforming diesel fuel. The conversion of diesel fuel into hydrogen is inefficient and may be complicated by the formation of soot. According to U.S. Pat. No. 7,357,900, about 2-4% of the diesel fuel is used for $NO_x$ control when diesel fuel is reformed into hydrogen for SCR. A better overall economy may be obtained by not sacrificing any of the diesel fuel, but instead by using ammonia with an Ammonia Flame Cracker for supplying hydrogen into the exhaust line. The better economy of the Ammonia Flame Cracker is due to the high ammonia-to-hydrogen conversion efficiency.

One embodiment of this invention uses a catalyst of at least nominal catalytic activity to initiate the combustion and decomposition of a rich, premixed, continuously flowing ammonia/air mixture. The ammonia/air mixture is usually of an equivalence ratio that is well above the normal rich flammability limit for ammonia in air. The ammonia combustion and decomposition reactions occurring on the catalyst's surface release heat and hydrogen, and this initial release permits flame propagation into portions of the gas which are not in contact with the catalyst. The ammonia combustion reaction is thus initiated on the catalyst's surface, but occurs substantially within the bulk gas. Catalysts thus serve to initiate reactions in ammonia/air mixtures which start the reaction sequence at an initial temperature which is lower than the ammonia cracking temperature. Combinations of mixture temperature in the catalyst inlet region and equivalence ratio may be chosen such that the adiabatic flame temperature equals or exceeds the ammonia cracking temperature. When the adiabatic flame temperature equals or exceeds the ammonia cracking temperature, the ammonia decomposition reaction occurs substantially within the flame, and the ammonia decomposition reaction does not depend on substantial contributions of catalytic activity. The catalyst thus needs not to be sized for providing enough catalytic sites for full decomposition of the ammonia on the surface of the catalyst. Instead, the catalyst is sized to provide a sufficient distribution of flame (flamelet) initiation points, and to provide sufficient initial hydrogen yield, such that the respective flamelets traverse the burning gas mixture before it flows appreciably far from the catalyst region. The ammonia combustion and decomposition reactions thus occur within and slightly downstream of the catalyst region.

Any possibly hot materials in contact with the ammonia/air mixture in regions upstream of the catalyst may be chosen to be substantially devoid of catalytic activity for either decomposing or combusting ammonia. In some instances the ammonia/air mixture may be preheated before coming into contact with the catalyst, and for these instances an absence of catalytic activity in possibly heated regions, upstream of the catalyst, ensures that a maximum heat transfer into the ammonia/air mixture can be obtained before any reactions begin. Once started, the reactions proceed without additional external heat input. In some instances Ammonia Flame Crackers, which use a catalyst to initiate the reactions, are operable without a provision for preheating the ammonia/air mixture.

In some instances, when the Ammonia Flame Cracker is started, the catalyst or other heater may be resistively heated by the application of electric power through wires. Other means of heating the catalyst are possible, including inductive heating, brief combustion of chemicals on the catalyst and/or surrounding structure, or an electric arc. Resistive heating of the catalyst may be used to start the ammonia combustion and decomposition reactions and to provide makeup heat to the burning gases, as required until the Ammonia Flame Cracker is fully warmed up. In some instances, the Ammonia Flame Cracker may be brought to a substantially fully warmed up state at startup by application of electric power to the catalyst or other heater and possibly also to other portions of the Ammonia Flame Cracker, immediately before mixture flow begins. In some instances, after the Ammonia Flame Cracker is started, the electric power applied to the catalyst or other heater may be turned off. In some instances, the electric power applied to the catalyst or other heater may be turned down and maintained at a nominal, possibly variable level for the purpose of fine control, such that the energy required to decompose ammonia is substantially provided by the combustion of some of the ammonia, and the ammonia combustion reaction is substantially sufficient to keep the catalyst hot. In some instances, the temperature of the ammonia/air mixture immediately upstream of the catalyst may be monitored, and the equivalence ratio and/or electric power applied to the catalyst or other heater may be controlled according to this temperature such that a particular chosen ammonia decomposition yield may be achieved, for example, substantially full decomposition of all ammonia not consumed in the ammonia combustion reaction.

Some embodiments use a heat exchanger to bring an ammonia/air mixture up to the ammonia cracking temperature, thereby initiating the ammonia combustion and decomposition reactions without the use of a catalyst. Ammonia crackers which are operable without catalysts are useful because some catalytic metals are expensive, and also because catalyst-free operation solves the problems concerning catalyst placement, and the durability of metals and metal catalysts at the ammonia cracking temperature. Even some platinum-group metals may be subject to slow oxidation, evaporation, sintering, migration or other degradation at the ammonia cracking temperature. The ammonia/air mixture autoignites at the ammonia cracking temperature, and heat is yielded, which may decompose additional ammonia in the mixture. Ammonia combustion and ammonia decomposition may also occur in separate loops if it is desired to exclude all of the water and some of the nitrogen that would otherwise be present in the hydrogen-containing product mixture. The heat released by ammonia combustion also maintains portions of the heat exchanger at temperatures which equal or exceed the ammonia cracking temperature. Ammonia crackers, which bring rich ammonia/air mixtures up to the ammonia cracking temperature by means of a heat exchange process and thereby ignite the mixture, are operable to decompose ammonia and produce a hydrogen gas mixture from normal air and ammonia as the only inputs, without the need for catalysts or for other combustible materials besides normal air and ammonia.

A hydrogen gas mixture produced by an Ammonia Flame Cracker may be used as the combustion promoter according to a combustion promoter/ammonia dual fuel map described in a previous U.S. Pat. No. 7,574,993. The specification for using a constant quantity of combustion promoter per firing cycle, for a given engine RPM (revolutions per minute crankshaft speed), is the simplest, reasonably accurate description of a necessary and sufficient condition required for burning ammonia in an engine. One advantage, derived from using an Ammonia Flame Cracker to produce a hydrogen gas mixture for use as the combustion promoter, is that the decomposition yield can be well controlled and thus the ammonia/hydrogen ratio can more easily be made to comply with a predetermined operating map, for example, a rough limit, than would be possible if an exhaust heat ammonia cracker were used.

For operation according to a combustion promoter/ammonia dual fuel map, some of the ammonia used by the engine is run through the Ammonia Flame Cracker and the Ammonia Flame Cracker may be controlled to give a substantially full ammonia decomposition yield, and some of the ammonia bypasses the cracker. A substantially full ammonia decomposition yield, in the Ammonia Flame Cracker, makes it possible to tightly control the ammonia/hydrogen ratio in the intake mixture, by varying the ratio of ammonia bypassing the Ammonia Flame Cracker to that which is run through the Ammonia Flame Cracker. Operation, at the rough limit on ammonia and the hydrogen gas mixture, minimizes the engineering requirements of the Ammonia Flame Cracker, for example, size, cost, energy consumption, required flow capacity, and quantity of materials used in the construction of the Ammonia Flame Cracker.

Alternatively, an engine can be fueled solely by the hydrogen-containing product mixture produced by an Ammonia Flame Cracker. An engine or other combustion apparatus can be run solely on the hydrogen-containing product mixture, toward the advantage that the exhaust emissions of ammonia and nitrous oxide can be made very small or zero. Thus engines, which may not use sophisticated emissions controls due to cost, space, weight or simplicity constraints, may use ammonia as the sole fuel without emission of large amounts of ammonia or nitrous oxide in the exhaust when all of the ammonia used by the engine system is run through an Ammonia Flame Cracker and the Ammonia Flame Cracker is controlled to give a substantially full ammonia decomposition yield. If the use of ammonia as a fuel becomes very widespread, then the additional loading of the biosphere with fixed nitrogen from engines may become a significant consideration. A full ammonia decomposition yield, for all fuel entering the engine, will significantly reduce the total quantity of fixed nitrogen in the exhaust, relative to the total quantity of fixed nitrogen emitted in the exhaust when a large fraction of raw ammonia is used.

Some embodiments of the Ammonia Flame Cracker produce a hydrogen-containing product mixture with a hydrogen/inert ratio of approximately 1:1 by volume. The extra inert nitrogen and water from the ammonia/air combustion has the effect of reducing $NO_x$ emissions when the hydrogen-containing product mixture is burned and also enables an engine to run solely on the hydrogen-containing product mixture at significantly higher loads and compression ratios without knock and backfire, than would be possible for operation on the 3:1 hydrogen/nitrogen mixture obtained by simply decomposing ammonia.

The entire hydrogen-containing product mixture can be metered into the engine in gaseous form. Alternatively, cooling may be used to lower the temperature of the hydrogen-containing product mixture and condense a substantial portion of the water which may be present in the mixture. This liquid water may be discarded without metering it into the engine, or a portion of the water may be discarded and the remainder may be metered into the engine, or all of the liquid water may be drafted into the engine along with the gaseous hydrogen and nitrogen portions. This liquid water can be used as an antiknock agent, thus permitting substantially supercharged engine operation on the hydrogen mixture. The liquid water vaporizes during compression, thus lowering the temperature of portions of gas yet to be burned. Knock is prevented when the temperature, of portions of gas yet to be burned, remains below the autoignition temperature of hydrogen at peak pressure. The extraction of liquid water from the hydrogen-containing product mixture permits the use of liquid water as an antiknock agent for a hydrogen fueled engine without separately storing water, and without separating water from the exhaust.

The engine may have a compression ratio which is chosen to be sufficiently high, such that the residual gas temperature at the end of the exhaust stroke is low enough to avoid autoigniting the intake mixture at the start of an intake stroke, thereby avoiding backfire. A portion of condensed water obtained from the hydrogen-containing product mixture may be fogged into the engine along with the intake mixture, sufficient to avoid knock at compression ratios which are high enough to avoid backfire. The quantity of liquid water fogged or otherwise metered into the engine, may be chosen such that the water is substantially fully vaporized before substantial combustion of the fuel begins. Any water not fully vaporized upon combustion of the fuel has its heat of vaporization effectively subtracted from the heat released by fuel combustion, thereby lowering the work yield and efficiency, and causing the engine to behave sluggishly. Preferably, no more liquid water should be metered into the engine intake than can be fully vaporized during an interval beginning at the start of compression and ending at the spark or other ignition event.

Notably, an engine which is normally run according to a dual fuel operating map, for example, a rough limit map as described in U.S. Pat. No. 7,574,993, may be run solely on the hydrogen gas mixture during warm-up and/or until exhaust catalytic converter light-off to minimize or eliminate the emission of ammonia in the exhaust, or to ensure a low COV(IMEP) during engine warm-up.

According to one representative embodiment, when combustion is initiated in a rich ammonia/air mixture by a catalyst of at least nominal catalytic activity, a full or partial ammonia decomposition yield may occur. The catalyst maintains a stable profile of temperature and catalytic activity, even with the electric power turned off, for combinations of gas temperature at the catalyst inlet, and equivalence ratio, for which the heat released by the ammonia combustion is at least sufficient, to raise the mixture temperature from a given catalyst inlet temperature to the ammonia cracking temperature, and also to decompose at least some of the remaining ammonia. If the gas temperature at the catalyst inlet region is higher than or equal to the catalyst light-off temperature, then stable operation is assured. The catalyst's steady state behavior may be described as being like a continually operating, unpowered igniter which ignites the ammonia/air mixture in many points as the mixture passes over the catalyst.

Stable operation may also occur even when the gas temperature at the catalyst inlet is lower than the catalyst light-off temperature. If the equivalence ratio is chosen such that the quantity of heat, released by the exothermic formation of water, is sufficient to bring the mixture up to the ammonia cracking temperature and decompose all of the ammonia, and if enough heat can radiate or conduct backward through the catalyst region to keep the upstream portions of the catalyst hot, then stable operation can be achieved. Experiments verified that when the catalyst inlet temperature is about 25° C., the catalyst maintains a stable temperature and catalytic activity profile with the electric power turned off, when the ammonia/air equivalence ratio is less than about 2. This result is consistent with theoretical calculations.

In some instances, the Ammonia Flame Cracker may have a catalyst inlet temperature which is elevated substantially above the ambient temperature, such as in the compressed zone of a turbine, or for cases in which the ammonia/air mixture is preheated by one or more components of the Ammonia Flame Cracker before the mixture reaches the catalyst. Elevated catalyst inlet temperatures permit obtaining full ammonia decomposition yield at higher range of ammonia/air equivalence ratios.

If the ammonia/air mixture is preheated with just enough heat to bring the mixture temperature up to the temperature at which ammonia begins to decompose spontaneously at a high rate without the aid of a catalyst, then all of the heat released by the ammonia combustion reaction may be utilized by the ammonia decomposition reaction. An equivalence ratio may be chosen such that, when the ammonia combustion and decomposition reactions are run to completion, then the heat released by the formation of water equals the heat absorbed by the decomposition of ammonia, and the mixture undergoes zero temperature change when it reacts. This limiting theoretical case assumes zero heat loss and the use of a perfect counterflow heat exchanger to preheat the incoming ammonia/air mixture, using heat extracted from the outbound hydrogen-containing product mixture. The placement, of ammonia combustion and ammonia decomposition processes into separate loops, does not alter the theoretical limits of efficiency and yield. The theoretical limits of efficiency and yield are also unaffected by the use of pure oxygen instead of air. The theoretical limits are also unaffected by whether the ammonia and oxygen-containing gas are preheated separately and then burned when they mix. In practice, an Ammonia Flame Cracker can be operated at a high efficiency for converting ammonia into hydrogen in some instances, and for converting ammonia into a combination of hydrogen and sensible heat in other instances.

FIG. 1 shows a graph 100 of a trajectory 104 taken by ammonia, or a gas mixture containing ammonia, as heat is added to the gas at constant pressure. The "Temperature" and "Heat Addition" axes are labeled in unspecified units because graph 100 is intended to show basic features, the characteristics of which don't depend appreciably on particular values. Also, the actual quantities of heat added per mass of ammonia, through a given temperature range, will depend on unspecified parameters such as inert gases and other gases which may be mixed with the ammonia. Ammonia decomposition is modeled like a one-way phase transition. The ammonia decomposes irreversibly into hydrogen and nitrogen. In the absence of a catalyst, ammonia decomposes at a decomposition rate which is assumed to be zero for temperatures below the ammonia cracking temperature 112, and infinite for temperatures above the ammonia cracking temperature 112.

Various points 102, 106, 108, 110, and 114 on trajectory 104 are labeled in graph 100. Dashed line 105 shows that points 108 and 110, and also the portion of trajectory 104 between points 108 and 110, are directly across from the ammonia cracking temperature 112. The initial point 102 corresponds to a fresh ammonia-containing gas mixture at 25° C. For convenience, ambient temperature is assumed to be 25° C. for calculation of various curves, and the Heat Addition is set equal to zero at 25° C. for point 102. The actual ambient temperature may be substantially higher or lower than 25° C.; nevertheless the qualitative characteristics of features described will remain the same. In departure upward and toward the right from point 102, the temperature of the ammonia-containing gas mixture goes up as heat is added, and in the absence of a catalyst, very little or none of the ammonia decomposes during movement on the portion of trajectory 104 between points 102 and 108. The ammonia cracking temperature 112 is reached at point 108. At point 108, further heat addition results in the endothermic decomposition of the ammonia into hydrogen and nitrogen. Ammonia decomposition occurs at the ammonia cracking temperature 112 within the portion of trajectory 104 between points 108 and 110, wherein very little or none of the ammonia is decomposed at 108, and substantially all of the ammonia is decomposed at 110. Further heat addition, into the gas mixture beyond point 110, causes the gas temperature to become increasingly higher than the ammonia cracking temperature 112.

Heat addition can occur by external application of heat to the gas mixture by a heat exchange process, such as heat transfer from a hotter region or by electrical heating. Heat addition can also occur from within the gas mixture by breaking and forming chemical bonds other than those involved in the decomposition of ammonia into hydrogen and nitrogen. For example, if the ammonia-containing gas mixture also contains molecular oxygen, then the exothermic formation of water may be one of the sources of added heat which moves the gas mixture through portions of trajectory 104. The molecular oxygen may be supplied by the inclusion of substantially pure oxygen, or normal air, or some combination thereof, in the mixture. Generally, the mixture contains at least ammonia and oxygen, and it may also contain inert gases such as nitrogen, if normal air is used.

In an idealized example, a homogeneous ammonia/air mixture, which is much richer than the upper flammability limit of ammonia in air, is preheated from an ambient temperature of about 25° C. to the ammonia cracking temperature 112, thereby moving the gas mixture upward through the portion of trajectory 104 between points 102 and 108. In the absence of a catalyst, the rich ammonia/air mixture remains chemically inert during movement from point 102 to point 108, because the ammonia does not appreciably decompose, nor does it autoignite at 850° C., but instead reacts in a manner later described, and at the ammonia cracking temperature 112, which is higher than 1100° C. The mixture does not support flame propagation into portions of the mixture which are not yet fully preheated. Water also cannot faint in the rich ammonia/air mixture until the ammonia begins to decompose, because molecular hydrogen becomes freely available to react with oxygen only when ammonia decomposes. The exothermic formation of substantial quantities of water, and attendant release of heat, is thus locked out until the ammonia/air mixture either reaches the ammonia cracking temperature 112, or encounters a catalyst, and some embodiments of the Ammonia Flame Cracker are designed to take advantage of this lock-out effect.

When point 108 is reached, a small quantity of ammonia decomposes, releasing hydrogen, and this hydrogen quickly reacts with available oxygen at high temperatures, forming water and releasing heat, thus decomposing more ammonia. Each combusted hydrogen molecule releases enough heat to decompose several ammonia molecules, thus releasing many more additional hydrogen molecules than are consumed in each generation. A rapidly growing avalanche of water formation and ammonia decomposition is thus initiated at the ammonia cracking temperature 112, and the formation of water continues until all of the molecular oxygen is consumed. The heat, released by the formation of water, moves the gas mixture along trajectory 104 from point 108 toward point 110. The excursion from point 108 to point 110 occurs at the ammonia cracking temperature 112. If the mixture runs out of oxygen before all of the ammonia is decomposed, then the state of the mixture at the end of its excursion on trajectory 104 will correspond to a point somewhere between points 108 and 110 on trajectory 104, and the peak temperature of the mixture will be the ammonia cracking temperature 112. If all of the ammonia is decomposed before the mixture runs out of oxygen, then the state of the mixture, at the end of its excursion on trajectory 104, will correspond to a point somewhere above and to the right of point 110 on trajectory 104, and the peak temperature of the mixture will be higher than the ammonia cracking temperature 112.

In the idealized example, an ammonia/air equivalence ratio is chosen such that the quantity of heat, released by the formation of water, is just sufficient to move the gas mixture from point 108 to point 110, thus decomposing all of the ammonia, when all of the molecular oxygen is consumed. Upon reaching point 110, the reacted product gas mixture is then heat exchanged with an equal mass of fresh incoming ammonia/air reactant mixture. If an ideal, counterflow heat exchanger is used, then the next incoming mass of ammonia/air mixture can be preheated from point 102 to point 108 on trajectory 104, and the chemical reactions begin anew. This process can be run under continuous flow.

Figure 2:
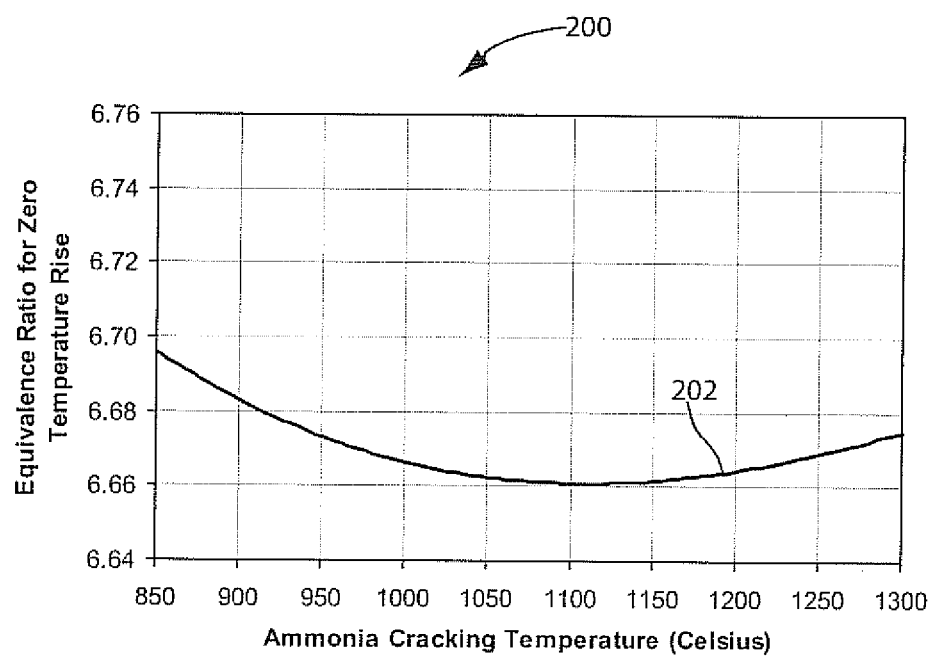
FIG. 2 is a graph showing the equivalence ratio at which the ammonia combustion and ammonia decomposition give zero temperature rise when the reactions are run to completion.

FIG. 2 shows a graph 200 of a curve 202 which is used for calculating a theoretical upper performance limit of an Ammonia Flame Cracker incorporating an ideal counterflow heat exchanger, according to the idealized example described in the discussion of FIG. 1. Curve 202 shows ammonia/air equivalence ratios for which the quantity of heat, released by the exothermic formation of water, is just sufficient to move the gas mixture from point 108 to point 110 on trajectory 104, thereby fully decomposing the ammonia at the highest theoretically possible ammonia-to-hydrogen conversion efficiency. The heat, released by the formation of water, is balanced with the heat, absorbed by the decomposition of ammonia, to give a zero temperature rise when the reactions are run to completion. The enthalpies of formation of ammonia, water, or any other compound vary as a function of reaction temperature because, over a given temperature range, the total heat capacities of the reactants and products, in any given chemical equation, are not generally the same. Therefore the equivalence ratio, for a zero temperature rise, also varies as a function of the reaction temperature. Each equivalence ratio on curve 202 is 1.5 times the molar enthalpy of formation of water, divided by the molar enthalpy of formation of ammonia, for each temperature. The enthalpy of formation assigns a value of zero to pure chemical elements in their usual form, for example, diatomic hydrogen.

The horizontal axis of graph 200 is labeled "Ammonia Cracking Temperature" because, for an excursion from point 108 to point 110 on trajectory 104, the reaction temperature is the ammonia cracking temperature 112. Real, non-catalyzed ammonia decomposition occurs at a finite rate which increases exponentially with increasing temperature. Therefore, the ammonia cracking temperature 112 increases slightly, with increasing ammonia/air mixture flow rate, and decrease slightly, with decreasing mixture flow rate, such that the ammonia decomposition rate matches the throughput rate. Experimental measurements of the ammonia cracking temperature 112 indicate that ammonia decomposes into hydrogen and nitrogen without the aid of a catalyst, at a high rate, and at a high attainable decomposition yield when the temperature is about 1200-1300° C. However, at very low flow the ammonia cracking temperature 112 may be 1150° C., and at very high flow the ammonia cracking temperature 112 may be 1350° C., for example. All actual ammonia cracking temperatures appear to be higher than about 1100° C. All ammonia cracking temperatures lower than about 1100° C. are hypothetical, because non-catalyzed ammonia decomposition does not occur at an appreciable rate for temperatures lower than about 1100° C. Curve 202 is shown for both the actual and the hypothetical ammonia cracking temperature regions, because its shape, in both regions, is relevant for additional discussion to follow.

At about 1100° C., curve 202 has a minimum of 6.66, and at that point the total heat capacities of the products and reactants are equal. For an Ammonia Flame Cracker incorporating an ideal counterflow heat exchanger in which the outgoing products are heat exchanged with the incoming reactants, the temperatures of the products and reactants will be equal where the total heat capacities are equal, at about 1100° C. The portion of the curve 202, for which the temperature is lower than about 1100° C., has a negative slope, indicating that the total heat capacity of the product mixture is greater than the total heat capacity of the reactant mixture. Therefore the product mixture contains more than enough heat to preheat the reactant mixture from ambient temperature to 1100° C.

However, the reactant mixture must also complete the excursion from 1100° C. to the ammonia cracking temperature 112 before it can react at point 108 on trajectory 104. For temperatures of interest which are higher than about 1100° C., curve 202 has a weakly positive slope, indicating that the total heat capacity of the reactant mixture is very slightly greater than the total heat capacity of the product mixture. However, this difference in total heat capacities is negligibly small. Therefore the product mixture contains enough heat to continue preheating of the reactant mixture from 1100° C. to a temperature which is negligibly lower than the ammonia cracking temperature 112. The effect, of this negligible temperature difference on the reaction energy balance, can be exactly compensated by using the ammonia/air equivalence ratio=6.66, which is the minimum of curve 202, for all actual ammonia cracking temperatures.

Therefore, an ammonia/air or ammonia/oxygen mixture of equivalence ratio=6.66 has just sufficient internal chemical energy for completing a total excursion on trajectory 104 from ambient temperature near point 102 to having fully decomposed the ammonia at point 110, if the reactants and products are counterflow heat exchanged in an ideal heat exchanger. The theoretical upper performance limit, for a heat exchanged Ammonia Flame Cracker, thus corresponds to a full ammonia decomposition yield, obtained at an equivalence ratio of 6.66, and an ammonia-to-hydrogen chemical energy conversion efficiency of 97.3% on a lower heating value (LHV) energy basis, and that's as good as an Ammonia Flame Cracker can be. These calculated results for the theoretical upper performance limit do not depend on the particular values for either the ambient temperature or the ammonia cracking temperature 112. If ammonia and normal air are used in the mixture, then the hydrogen product mixture will contain about 52% hydrogen by volume on a wet basis, or 58% on a dry basis. The ammonia-to-hydrogen conversion efficiency and equivalence ratio at the theoretical upper performance limit remain the same if pure oxygen or oxygen-enriched air is used instead of normal air. If pure oxygen is used instead of normal air, the hydrogen content of the product mixture, at the theoretical upper performance limit, changes to about 64% hydrogen by volume on a wet basis, or 72% on a dry basis.

A counterflow heat exchanged Ammonia Flame Cracker may have heat exchanger losses which cause a departure from the theoretical upper performance limit. If a product mixture ends its excursion on trajectory 104 at point 110, then the incoming reactant mixture may reach a preheated state which falls short of point 108, and thus the preheat temperature is somewhat lower than the ammonia cracking temperature 112, by a small temperature deficit. This temperature deficit, or more generally, the product-to-reactant temperature drop, is a characteristic of the heat exchanger's losses. A premixed ammonia/air mixture, which falls short of reaching the ammonia cracking temperature 112, can be made to react by flowing of the mixture over a heater. The heater may be a non-catalytic, electrically driven heating element which is always turned on during operation. An appropriately controlled, electric heater should have sufficient power, such that at least enough heat is released in the vicinity of the heater to raise the temperature, of at least a portion of the mixture, to the ammonia cracking temperature 112. Otherwise, the heater may be a catalytic filament or other catalyst, which heats the mixture by combustion of some of the ammonia, rather than by electrical heating. The catalyst decomposes some of the ammonia, releasing hydrogen, which immediately combines with oxygen, releasing heat. An appropriately designed catalyst should have sufficient distribution and catalytic activity, such that at least enough heat is released in the vicinity of the catalyst to raise the mixture temperature to the ammonia cracking temperature 112. When the mixture reaches the ammonia cracking temperature 112, the mixture undergoes a gaseous-phase avalanche of water formation and ammonia decomposition, until all of the remaining oxygen is consumed, without requiring further heat addition by the heater or catalyst. A catalyst may serve to initiate reactions, but the catalyst need not be sized for providing enough catalytic sites to catalyze all of the ammonia decomposition reactions. Most of the ammonia decomposition reactions occur in the aforementioned avalanche, which is precipitated at the ammonia cracking temperature 112.

In one example, an outgoing product mixture reaches point 110 at the end of its excursion on trajectory 104, and the incoming reactant mixture reaches a preheated state corresponding to point 106 on trajectory 104. Point 106 is drawn for a preheat deficit of 100° C. below the ammonia cracking temperature 112, which can be overcome by a release of hydrogen, equivalent to the decomposition of about 3% of the ammonia on a catalyst. Prior art examples, which operate without the benefit of avalanche reactions involving ammonia and oxygen at temperatures exceeding 1100° C., must therefore use about 30-40 times as much catalyst in order to fully decompose ammonia at the same rate.

A product mixture may end its excursion at a point somewhere above and to the right of point 110 on trajectory 104, thereby decomposing all of the ammonia. The product mixture ends its excursion on trajectory 104 at a post-reaction temperature which is somewhat higher than the ammonia cracking temperature 112, by a small temperature excess. If this temperature excess is at least as large as the product-to-reactant temperature drop due to heat exchanger losses, then the incoming ammonia/air mixture will reach point 108 on trajectory 104 and then fully react without the aid of any electric heater or catalyst. Catalyst-free operation is advantageous because catalyst cost, placement, and durability can still be significant problems even for Ammonia Flame Crackers which use 30-40 times less catalyst than catalytic ammonia crackers which catalyze all of the ammonia decomposition reactions. Operation at post-reaction temperatures in excess of the ammonia cracking temperature 112 is advantageous because trace quantities of ammonia may still be present in the mixture at point 110 on trajectory 104, and even trace quantities of ammonia will decompose essentially completely at temperatures in excess of the ammonia cracking temperature 112.

If, by choice of ammonia/air equivalence ratio, the post-reaction temperature excess is made larger than necessary to ensure that the incoming reactant mixture will reach point 108 on trajectory 104, and thus ensure that the fully non-catalyzed operation won't extinguish, then the incoming reactant mixture simply reacts at a location further upstream within the heat exchanger. The reaction region simply moves upstream or downstream in response to flow transients. A premixed ammonia/air or ammonia/oxygen mixture does not accept additional preheating beyond the ammonia cracking temperature 112 because it reacts spontaneously when it reaches the ammonia cracking temperature 112. Therefore a positive feedback regime, leading to thermal runaway, does not occur. The inertness of an ammonia/air mixture below the ammonia cracking temperature 112, and the mixture's inability to accept additional preheating beyond the ammonia cracking temperature 112, ensures the inherent stability of the operation of a heat exchanged, premixed Ammonia Flame Cracker.

In one example, an outgoing product mixture reaches point 114 at the end of its excursion on trajectory 104. Point 114 is drawn appropriately for a temperature excess of 100° C. above the ammonia cracking temperature 112, sufficient to overcome a product-to-reactant temperature drop of up to 100° C. in this particular example, due to heat exchanger losses, and thus move the incoming reactant mixture to a preheat state corresponding to point 108 on trajectory 104. The product-to-reactant temperature drop, for a given heat exchanger in a given operating condition, may be larger or smaller than 100° C. Whether the product-to-reactant temperature drop, due to heat exchanger losses, is taken up in a reactant mixture's preheat temperature deficit, or a product mixture's post-reaction temperature excess, an equivalence ratio of somewhat less than 6.66 can be used, to compensate for heat exchanger losses. It is thus the task of an Ammonia Flame Cracker's designer to strive toward 6.66.

If no catalyst is used in a fully premixed, counterflow heat exchanged Ammonia Flame Cracker, and if the incoming ammonia/air mixture fails to reach point 108 on trajectory 104, then the ammonia/air mixture will not react at all and the Ammonia Flame Cracker will cease to produce hydrogen. A catalyst-free, fully premixed, counterflow heat exchanged Ammonia Flame Cracker is thus capable of go/no-go functionality, wherein either all of the ammonia decomposes when the reacting mixture moves beyond point 110 on trajectory 104, or else it doesn't react at all. Thus the catalyst-free, fully premixed, counterflow heat exchanged Ammonia Flame Cracker will not continue to operate if there is substantial ammonia content in the product mixture. An engine or other combustion system incorporating a catalyst-free, fully premixed, counterflow heat exchanged Ammonia Flame Cracker will stall, extinguish or otherwise stop, rather than continue to operate with substantial quantities of ammonia, or undesirable minor products of ammonia combustion, such as nitrous oxide, in the exhaust.

Figure 3:
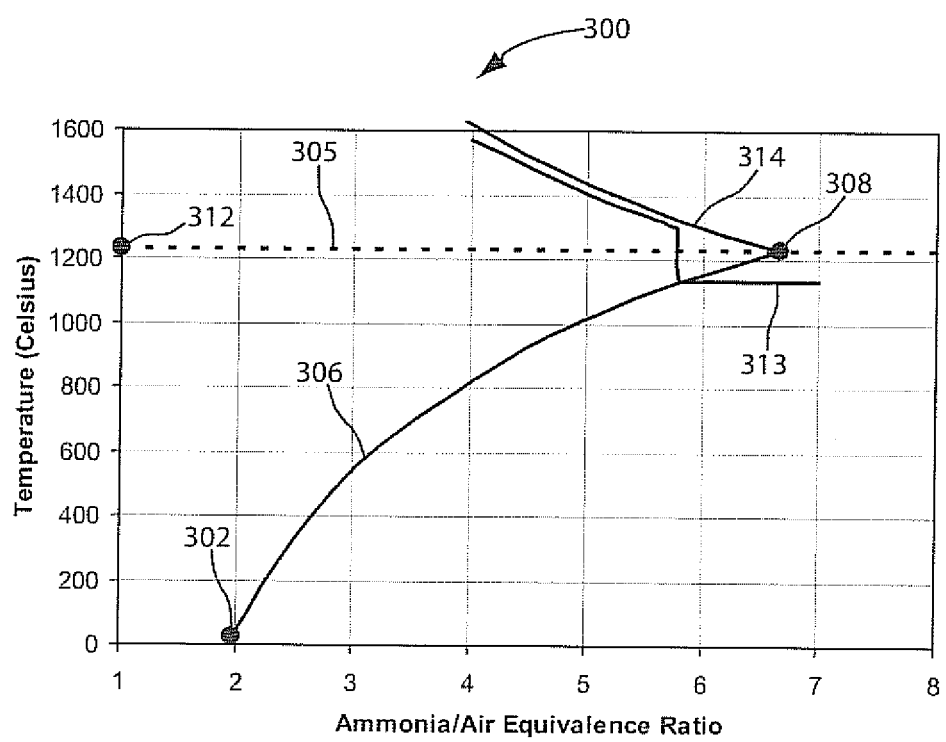
FIG. 3 is a graph showing a representative performance curve of a heat exchanged Ammonia Flame Cracker among curves from a theoretical model.

Referring to FIG. 3, a graph 300 is shown, and this graph contains information about a more general case of Ammonia Flame Cracker operation. The air is modeled as consisting of 21% oxygen and 79% nitrogen by volume, and the ammonia cracking temperature 312 is assumed to be 1500 Kelvin=1227° C., for the calculation of the curves in graph 300. Additional heating of the mixture, due to the application of electric power to one or more elements, is assumed to be zero for the calculation of the curves in graph 300. Horizontal dashed line 305 shows the placement of features in graph 300 in relation to the ammonia cracking temperature 312. The theoretical upper performance limit is covered in this description, and graph 300 also covers cases for which the actual performance, of an Ammonia Flame Cracker, departs from the previously described theoretical upper performance limit.

A rich, premixed ammonia/air reactant mixture may be preheated to a temperature corresponding to a point somewhere between points 102 and 108 on trajectory 104, just before reactions are started on a catalyst. Once started, the reactions are assumed to proceed adiabatically, and the heat released, by the exothermic formation of water, moves the mixture along trajectory 104 toward point 110. Each point on curve 306, between points 302 and 308, describes combinations of reactant preheat "Temperature" and "Ammonia/Air Equivalence Ratio", for which just enough heat is released, by the exothermic formation of water, to move the mixture from the preheat temperature corresponding to a point somewhere between points 102 and 108, to point 110 on trajectory 104, when all of the oxygen is consumed. A substantially full ammonia decomposition yield is thus obtained. Point 302 on curve 306 corresponds to a preheat temperature of 25° C., and a preheat condition corresponding to point 102 on trajectory 104. For point 302, the ammonia/air equivalence ratio is 1.98. Therefore, when the ammonia/air equivalence ratio is 1.98, just enough heat is released, by the exothermic formation of water, to move the mixture from point 102 to point 110 on trajectory 104 when all of the oxygen is consumed. An ammonia/air mixture cannot be preheated beyond the ammonia cracking temperature 312 before the reactions begin, because the mixture reacts spontaneously at the ammonia cracking temperature 312. Therefore curve 306 ends at the ammonia cracking temperature 312, here assumed to be 1227° C., at point 308, which is drawn on horizontal dashed line 305 directly across from the ammonia cracking temperature 312. Point 308 corresponds to a preheat temperature which is equal to the ammonia cracking temperature 312 and a preheat condition corresponding to point 108 on trajectory 104. For point 308, an equivalence ratio is selected, such that just enough heat is released, by the exothermic formation of water, to move the mixture from point 108 to point 110 on trajectory 104 when all of the oxygen is consumed. Point 308 thus corresponds to the previously described theoretical upper performance limit, and is assigned an ammonia/air equivalence ratio of 6.66.

A rich, premixed ammonia/air reactant mixture may be preheated to the ammonia cracking temperature 312, corresponding to the ammonia cracking temperature 112, at point 108 on trajectory 104, whereupon the mixture reacts spontaneously and without the aid of a catalyst. The mixture remains inert during preheat until it reaches the ammonia cracking temperature 312. However, the mixture does not accept additional preheating beyond the ammonia cracking temperature 312 because it reacts spontaneously when it reaches the ammonia cracking temperature 312. Therefore the starting temperature of the reactions is the ammonia cracking temperature 312. Once started, the reactions are assumed to proceed adiabatically, and the heat released, by the exothermic formation of water, moves the mixture to a state of full ammonia decomposition, and a post-reaction temperature, which equals or exceeds the ammonia cracking temperature 312. Each point on curve 314 describes combinations, of "Ammonia/Air Equivalence Ratio", and post-reaction "Temperature", reached by a mixture which begins to react at point 108, and ceases reacting when it runs out of oxygen at a point somewhere above and to the right of point 110 on trajectory 104. Curve 314 happens to be very nearly the mirror image of curve 306 about dashed line 305. No minimum ammonia/air equivalence ratio is specified for curve 314. However, curve 314 climbs with decreasing equivalence ratio, and in practice it is necessary to keep the ammonia/air equivalence ratio above a chosen minimum value, for example about 4, such that the maximum post-reaction temperature of the gas mixture does not exceed durability limits of materials, from which an Ammonia Flame Cracker is constructed. Curve 314 ends at the ammonia cracking temperature 312, and at an equivalence ratio for which just enough heat is released, by the exothermic formation of water, to move the mixture from point 108 to point 110 on trajectory 104 when all of the oxygen is consumed. Therefore, curve 314 ends at the same point 308, at which curve 306 also ends, and at the same ammonia/air equivalence ratio of 6.66.

Figure 4:
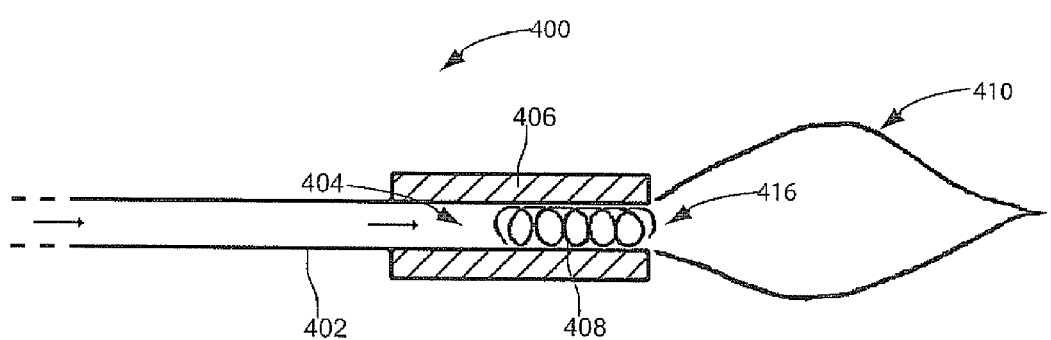
FIG. 4 is a schematic diagram of an Ammonia Flame Cracker according to one representative embodiment.

Referring to FIG. 4, according to one representative embodiment, an Ammonia Flame Cracker 400 includes a tubing 402, an insulating layer 406 and a heater 408. The tubing 402 is constructed of materials, for example, ceramics, chosen to withstand the high temperature and the chemical environment of a combusting ammonia/air mixture. The tubing 402 may also be selected of materials or treated so as to be substantially devoid of catalytic activity in regions upstream of the heater 408. The small arrows show the direction of flow. The ammonia/air equivalence ratio, and total mixture content and mass flow may be controlled or conditioned by devices (not shown) placed upstream or downstream of the tubing 402, or upstream downstream of any inlet or outlet of any Ammonia Flame Cracker disclosed herein. These devices include, but are not limited to: compressors, valves, pumps, restrictors, venturi tubes, aspirator tubes, gas regulators, components of an engine, an ammonia vaporizer or water condenser possibly incorporated into any Ammonia Flame Cracker disclosed herein, a gas purifier such as a pressure swing adsorption unit, or any means involving the utilization of the ammonia's relatively elevated pressure such as an expander which extracts work from relatively pressurized ammonia gas. The working pressure inside tubing 402 may be about 1 atmosphere, but in some cases it may be substantially higher or lower than 1 atmosphere. Ammonia Flame Crackers disclosed herein operate in very much the same manner over a broad range of pressures. However, working pressures, possibly differing substantially from 1 atmosphere or ambient, can be used toward particular engineering advantages, for example, making equipment smaller or for matching required input or output pressures upstream or downstream of an Ammonia Flame Cracker. An insulating layer 406 is useful for maintaining a stable profile of temperature and possible catalytic activity on heater 408. The insulating layer 406 may consist of various layers, including but not limited to one or more of the following: fibrous insulation, layers of metal film, one or more optical coatings, and one or more vacuum jackets, which are intended to reduce convective, conductive and radiative losses from the heater region. The insulating layer 406 substantially reduces a possibly otherwise large and unknown heat loss through the side of the tubing 402. This heat loss, if not controlled or minimized, could render the flame cracking process to be substantially non-adiabatic, which may significantly complicate the control of the Ammonia Flame Cracker 400. The insulating layer 406 may be omitted for instances in which the flame cracking process occurring in the vicinity of heater 408 can be rendered substantially adiabatic by means other than inclusion of insulating layer 406, for example, by making tubing 402 and heater 408 sufficiently large.

The Ammonia Flame Cracker 400 does not include a provision for heat exchanging the reactants and products outside the region of heater 408, although a reacting gas mixture can borrow heat and then return it to/from heater 408 in a way that can be construed as a heat exchange process. The state of the gas mixture in region 404 may thus correspond to ambient temperature near point 102 on trajectory 104. More generally, the state of the gas mixture in region 404 corresponds to a point somewhere below and to the left of point 108 on trajectory 104. A temperature probe (not shown) may be placed in region 404, and the ammonia/air equivalence ratio and/or electric power applied to heater 408 may be controlled according to this temperature probe's reading. The heater 408 may be a non-catalytic, electrically driven heating element which is always turned on during operation of Ammonia Flame Cracker 400. Otherwise, the heater 408 may be a catalytic filament or other catalyst, which heats the mixture by combustion of some of the ammonia, rather than by electrical heating. Heater 408 may also be a catalyst which is electrically heated only during startup. Hereafter the heater 408 will be called a catalyst 408.

An ammonia/air equivalence ratio may be selected such that the ammonia/air mixture has at least enough oxygen to complete an excursion to point 110 on trajectory 104 when all of the oxygen is consumed. In some instances, the gas temperature in region 404 may be lower than the light-off temperature of the catalyst 408. Although the ammonia/air mixture may have enough oxygen to react until it reaches point 110 on trajectory 104, the gas temperature must first be raised before it can react. However, the incoming ammonia/air mixture borrows a small quantity of heat, from the catalyst 408, sufficient to raise the mixture to a temperature at which it will react on the catalyst 408. The borrowed heat is then immediately returned to the catalyst 408 when the mixture reacts. The mixture behaves as though it is simply made to react on the catalyst 408, and the total energy balance, which determines the location where the mixture ends its excursion on trajectory 104, is otherwise unaffected by the presence of the catalyst 408.

If no electric power is applied to catalyst 408 during normal running, then the catalyst 408 must be designed to have sufficient distribution and catalytic activity, such that enough heat is released in the vicinity of the catalyst 408 to move the mixture at least far enough on trajectory 104 to reach the ammonia cracking temperature 112. Once the mixture reaches the ammonia cracking temperature 112, the mixture undergoes an avalanche of water formation and ammonia decomposition, until all of the remaining oxygen is consumed, without requiring further assistance from the catalyst 408. Thus, the catalyst 408 serves to initiate reactions, but the catalyst 408 need not be sized for providing enough catalytic sites to catalyze all of the ammonia decomposition reactions.

A stable temperature and catalytic activity profile on catalyst 408 can be maintained if the adiabatic flame temperature of the ammonia/air mixture is high enough. Experiments showed that when the gas temperature in region 404 is about 25° C., the catalyst 408 maintains a stable temperature and catalytic activity profile with the electric power turned off when the ammonia/air equivalence ratio is less than about 2. Calculations show that, at an ammonia/air equivalence ratio of 1.98, just enough heat is released, by the exothermic formation of water, to move the mixture from point 102 to point 110 on trajectory 104 when all of the oxygen is consumed. It appears that a stable profile of temperature and catalytic activity on catalyst 408 can be readily maintained if the reacting gas mixture has enough oxygen to at least reach point 110 on trajectory 104.

Although Ammonia Flame Cracker 400 does not include a provision for preheating the ammonia/air mixture before it reaches the catalyst 408, the gas temperature in region 404 may be elevated substantially above ambient temperature for operation of an Ammonia Flame Cracker 400 within a turbine or other elevated temperature environment. Elevated temperatures, in region 404, are functionally equivalent to preheating. If no electric power is applied to catalyst 408 during normal running, then curve 306 describes the "Ammonia/Air Equivalence Ratio" for which the reactant mixture has just enough oxygen to complete an excursion to point 110 on trajectory 104. The gas temperature in region 404 is the "Temperature" for curve 306.

Ammonia Flame Cracker 400 may be started by heating at least a portion of tubing 402 or the catalyst 408, to a high temperature possibly exceeding the ammonia cracking temperature. This heating at startup can be accomplished by electrical resistive heating of components of Ammonia Flame Cracker 400, or by combustion of chemicals and subsequent passage of these combusted chemicals over surfaces within the Ammonia Flame Cracker 400. Fuels stored separately from the ammonia may be combusted with air or with ammonia and air, or ammonia may be combusted with substantially pure oxidizers or with oxidizer-enriched air, or with air. Burners and/or igniters (not shown) such as electric arcs, flame holders, surface mix burners, mixing burners or other burners, or catalysts, which are dedicated to combustion of chemicals during startup of ammonia flame cracker 400, may be placed within, or in communication with, region 404. In some cases, the chemicals combusted during startup may form a combustible mixture when they react, and this combustible mixture may be used to immediately start and run a turbine or other hydrogen-consuming apparatus while the Ammonia Flame Cracker 400 warms up. Otherwise, the combustible mixture may be burned with more air for additional heating, before passage over the surfaces of Ammonia Flame Cracker 400, if controls are provided which permit doing so safely.

In some applications, the chemical energy and the sensible heat contained within a hot hydrogen-containing product mixture may be of equal value. Such as the case for operation of an Ammonia Flame Cracker 400 within the combustion zone of a turbine, or for operation of an Ammonia Flame Cracker 400 as a gas burner in a cooking or heating appliance. The hot hydrogen-containing product mixture, exiting through region 416, may be immediately combusted in a flame 410, which burns in the surrounding air. The resulting total heat release, due to combusting the hydrogen in flame 410, and also due to the hydrogen-containing product mixture's sensible heat in region 416 prior to combustion in flame 410, is equal to the heat release which would be obtained if the ammonia were fully combusted in a single-step process. Thus the maximum attainable thermal efficiency of the Ammonia Flame Cracker 400, taken on the basis of sensible heat and hydrogen, out, over ammonia, in, may approach 100%.

Figure 5:
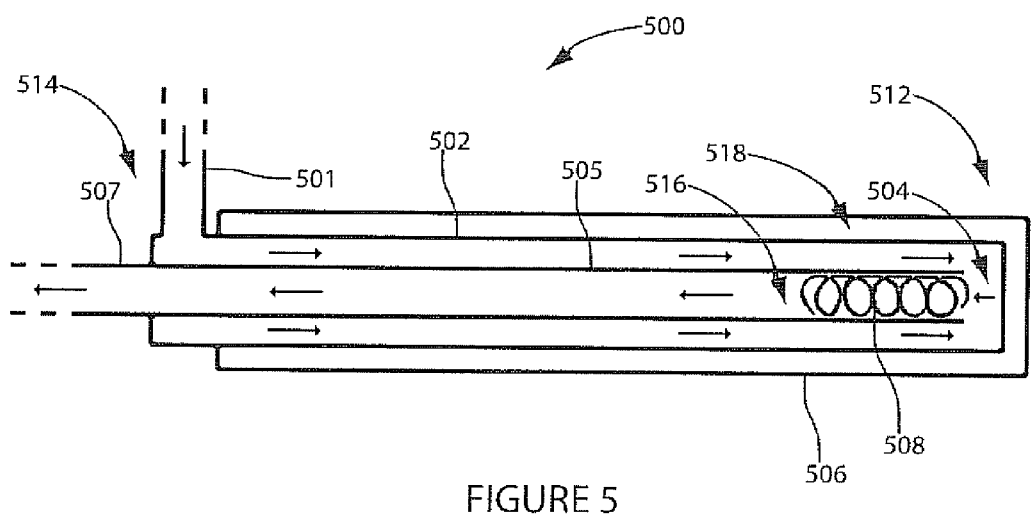
FIG. 5 is a schematic diagram of a heat exchanged Ammonia Flame Cracker according to one representative embodiment.

Referring to FIG. 5, according to one embodiment, an Ammonia Flame Cracker 500 includes concentric, round tubings 502, 505, and 506, and a heater 508. The heater 508 may be a non-catalytic, electrically driven heating element which is always turned on during operation of Ammonia Flame Cracker 500. Otherwise, the heater 508 may be a catalytic filament or other catalyst, which heats the mixture by combustion of some of the ammonia, rather than by electrical heating. Heater 508 may also be a catalyst which is electrically heated only during startup. Hereafter the heater 508 will be called a catalyst 508. The tubings 502 and 505 are joined near end 514 and constructed of materials, for example, ceramics, chosen to withstand the high temperature and the chemical environment of a combusting ammonia/air mixture, and also for appropriate electrical and thermal properties. The Ammonia Flame Cracker 500 combusts and decomposes a rich, premixed ammonia/air mixture in the vicinity of a catalyst 508 in much the same manner as does the Ammonia Flame Cracker 400 on catalyst 408. Additionally, the Ammonia Flame Cracker 500 incorporates provisions for preheating the incoming ammonia/air reactant mixture, before it reaches catalyst 508, by heat exchange, using the sensible heat contained in the outbound hydrogen-containing product mixture. This transfer of heat, from the outbound hydrogen-containing product mixture to the incoming ammonia/air reactant mixture, occurs by heat conduction and/or radiation through the walls of tubing 505. Surfaces contacting the mixture in the space between tubings 502 and 505, upstream of the catalyst 508, may be selected or treated so as to be non-catalytic, thus preventing the mixture from reacting before it is fully preheated.

A rich, premixed ammonia/air mixture enters the Ammonia Flame Cracker 500 through inlet 501 and travels through the space between tubings 502 and 505 until the mixture reaches region 504. The ammonia/air mixture reacts in the vicinity of catalyst 508, at which the ammonia/air mixture becomes a hydrogen-containing product mixture. Finally, the hydrogen-containing product mixture travels toward exit 507, through the space inside tubing 505, and leaves the Ammonia Flame Cracker 500 through exit 507. The small arrows show the direction of flow. Although the Ammonia Flame Cracker 500 could be operable with the flow going in the direction opposite of that described, the flow direction was chosen to direct the heat inward. Any heat ultimately lost through tubing 502 and then tubing 506 must first pass through the reactant mixture, entering through the space between tubings 502 and 505. Also, even a small product-to-reactant temperature drop can be made to significantly favor the minimization of radiative heat loss through vacuum space 518, when the flow direction is chosen as described.

The gas temperature in region 504 may typically be higher than the light-off temperature of the catalyst 508. The mixture behaves as though it is simply made to react on the catalyst 508, and if no electric power is applied to the catalyst 508, then the state of the mixture, at the end of its excursion on trajectory 104, is otherwise unaffected by the presence of the catalyst 508. A stable profile of temperature and catalytic activity on catalyst 508 is maintained for a wide range of operating conditions. Experiments showed that the catalyst 508 retains a stable profile of temperature and catalytic activity even when the reacting gas mixture doesn't have enough oxygen to reach a full ammonia decomposition yield, and thus the mixture ends its excursion on trajectory 104 somewhere between points 108 and 110. It appears that a stable profile, of temperature and catalytic activity on catalyst 508, can be readily maintained if the reacting gas mixture has enough oxygen to at least reach the ammonia cracking temperature 112.

Tubing 506 is joined to tubing 502 near end 514 and it forms the outer wall of a vacuum jacket, and tubing 502 forms the inner wall of this same vacuum jacket. Vacuum space 518 is thus bounded by the inner surface of tubing 506 and the outer surface of tubing 502. This vacuum space prevents conductive and convective heat loss from Ammonia Flame Cracker 500. Tubing 506 may be constructed of materials which are forbidden for use in portions, near end 512, of tubings 502 and 505. For example, some portions of tubings 502 and 505, especially portions near end 512, must be constructed of materials that can withstand temperatures near 1250° C. or higher, whereas tubing 506 may be constructed of materials which may melt at this temperature, for example, glasses, metals, and high reflectivity coatings that melt at temperatures which are lower than the ammonia cracking temperature 312. The inner surface of tubing 506 may be coated with a metal film, for example gold, silver, copper or aluminum, which has a high average reflectivity for blackbody radiation at 1250° C. The high reflectivity coating on the inner surface of tubing 506 reduces radiative heat loss from tubing 502, and also helps to keep tubing 506 relatively cool.

The portions of the outer surface of Ammonia Flame Cracker 500 may be fitted with cooling fins (not shown), a fan (not shown) or constructed from/coated with a material chosen for a high average emissivity for blackbody radiation near ambient temperature, which will further cool tubing 506 and end 514, and reduce the thermal stresses on all tubings and any of their joints and coatings. Additionally, the outer surface of tubing 502 may be coated with a film, for example tantalum, niobium, or others which are at least moderately reflective for blackbody radiation near 1250° C., have a sufficiently low vapor pressure near 1250° C., and can withstand the highest temperature reached on portions of tubing 502. The outer surface of tubing 502 may be coated with a diffusely reflective material such as magnesium oxide. A tantalum coating, on the outer surface of tubing 502, gives a high average mutual reflectivity with a silver coating, on the inner surface of tubing 506, for blackbody radiation near 1250° C. Additional reflective film or foil layers (not shown) may also be inserted in the vacuum space 518 between the inner surface of tubing 506 and the outer surface of tubing 502. The aspect ratio and materials of the Ammonia Flame Cracker 500 may be chosen to minimize radiative and conductive heat transfer down the length. Tubings 502 and 505 may be constructed of materials which are only moderately thermally conductive, such as mullite or aluminum oxide, so as to avoid excessive thermal conduction down the length. The outer surface of tubing 502 may also be constructed of, or coated or covered with, materials which have a very low vapor pressure at 1250° C. so as to minimize contamination of the vacuum space 518, and to avoid substantial contamination of any reflective coatings. Further insulation on the outside of tubing 506 only serves to raise the temperature of tubing 506, and has minimal impact on the rate of net heat loss from tubing 502.

A heat exchanger geometry, possibly differing from that shown in 500, may be chosen to improve heat exchange or to impede heat loss. For example, multiple tubings 505 and catalysts 508 may be housed within tubing 502. In another example, a matrix with hollow channels a few millimeters wide may be used instead of the single tubing 505. Such a matrix may contain, for example, an N by N array of square channels. Adjacent channels may alternate between connection to reactant entry 501 and product exit 507, in a checkerboard pattern. A portion of the matrix near end 512 may be coated with a catalyst. Any other Ammonia Flame Crackers disclosed herein may be similarly expanded into multiple channels, or use a geometry which differs from the particular examples shown.

The inlet 501 may be positioned off-center for the purpose of imparting swirl flow in the region between tubings 502 and 505. Other measures such as fins and turbulent elements (not shown) and choice of material for tubing 505 may also facilitate the heat exchange process. A temperature gradient exists along the length of the Ammonia Flame Cracker 500, such that the end 512 containing the catalyst 508 may be near the ammonia cracking temperature of about 1200-1250° C., or higher, and the end 514 with the reactant entry 501 and product exit 507 may have a temperature of, for example, lower than about 300° C. Materials and fabrication methods used in the construction and joining of tubings 502 and 505, and tubings 502 and 506, may thus be permitted at end 514, which may not be permitted at end 512, for example, o-rings, metals, glasses, adhesives, and glass-to-ceramic seals. The gas temperature in region 504 immediately upstream of the catalyst 508 may vary, and a temperature probe (not shown) placed in region 504 may provide information according to which the ammonia/air equivalence ratio and/or electric power applied to the catalyst 508, or applied to tubing 502 and/or tubing 505, may be controlled. If no electric power is applied to catalyst 508 during normal running, and if the gas temperature in region 504 is lower than the ammonia cracking temperature 312, then curve 306 describes an "Ammonia/Air Equivalence Ratio" for which the reactant mixture has just enough oxygen to complete an excursion to point 110 on trajectory 104. The gas temperature in region 504 is a preheat "Temperature" for curve 306.

If, as the result of choice of equivalence ratio, the temperature in region 516 downstream of the catalyst 508 is made to exceed the ammonia cracking temperature 312, then it is possible for the gas temperature, somewhere within the space between tubings 502 and 505, to equal or exceed the ammonia cracking temperature 312. In that case, the ammonia/air mixture ignites and decomposes in the space between tubings 502 and 505 before reaching region 504 and the catalyst 508 may be omitted. A new, fully non-catalytic embodiment of Ammonia Flame Cracker 500 thus emerges with the omission of catalyst 508. If no electric power is applied to Ammonia Flame Cracker 500 during normal running, and if the ammonia/air mixture ignites and decomposes in the space between tubings 502 and 505 before reaching region 504, then curve 314 describes the post-reaction "Temperature" of the product mixture in region 504 at a given "Ammonia/Air Equivalence Ratio".

Curve 313 describes the temperature in region 504 of Ammonia Flame Cracker 500 at different ammonia/air equivalence ratios. Curve 313 is a "performance curve" and it is representative of a family of curves (not shown) which characterize the mixture preheating effectiveness of a premixed, heat exchanged Ammonia Flame Cracker 500. In this particular example, curve 313 was calculated for an Ammonia Flame Cracker 500 which has about a 100° C. product-to-reactant temperature drop near end 512, which is representative of a practical design center. In this particular example, the product-to-reactant temperature drop is mostly due to resistance to heat flow between the inside and outside of tubing 505, but the calculation also includes the effects of a relatively small heat loss through the vacuum space 518. During operation of Ammonia Flame Cracker 500 on portions of curve 313 which are below and to the right of curve 306, the reacting gas mixture ends its excursion on trajectory 104 somewhere to the left of point 110, and there is a large ammonia fraction in the product mixture. During operation of Ammonia Flame Cracker 500 on the intersection of curves 313 and 306, the reacting gas mixture ends its excursion on trajectory 104 at point 110, and there may be a small ammonia fraction in the product mixture. During operation of Ammonia Flame Cracker 500 on portions of curve 313 which are between curve 306 and line 305, the reacting gas mixture ends its excursion on trajectory 104 somewhere slightly above and to the right of point 110, but the temperature in the space between tubings 502 and 505 is not yet high enough to ignite the mixture before it reaches the catalyst 508, and there may be very little or no ammonia in the product mixture. During operation of Ammonia Flame Cracker 500 on portions of curve 313 which are above line 305, the incoming ammonia/air mixture reacts before reaching the catalyst 508, the gas temperature in region 504 closely tracks curve 314, and there is essentially no ammonia in the product mixture. If an Ammonia Flame Cracker 500 is designed or controlled to consistently operate on portions of curve 313, or any other performance curve, which are above line 305, thereby igniting the mixture before it reaches the catalyst 508, then catalyst 508 may be omitted. More generally, if the ammonia/air mixture reaches the ammonia cracking temperature somewhere in the space between tubings 502 and 505 before reaching region 504, then the gas temperature in region 504 will be a post-reaction temperature which may closely track curve 314, and catalyst 508 may be omitted.

Curve 314 and the portion of line 305 which is to the right of point 308 constitute the performance curve for an ideal counterflow heat exchanger. In the limit of an arbitrarily improved heat exchanger with diminishingly small radiative losses, the performance curve for Ammonia Flame Cracker 500 converges on curve 314 and the portion of line 305 which is to the right of point 308.

A mixture containing ammonia and oxygen, entering inlet 501, may also be ignited non-catalytically by feeding back a portion of the hydrogen product mixture into the incoming reactant mixture. The hydrogen feedback flow should be sufficiently high, so as to raise the temperature of the mixture to the ammonia cracking temperature 312 and thus precipitate the avalanche reactions. Catalyst 508 may thus be omitted. Hydrogen feedback can be obtained by passage of a portion of the hydrogen product mixture, from the space within tubing 505 to the space between tubings 502 and 505, through perforations (not shown) in tubing 505 near end 512. The space between tubings 502 and 505 may be narrowed in the vicinity of the perforations in tubing 505 so as to generate the relative vacuum required to drive the hydrogen feedback flow. For the use of hydrogen feedback, the average preheat temperature should be higher than the autoignition temperature of hydrogen, which is about 500° C., and preferably the preheat temperature should be in the vicinity of the ammonia cracking temperature 312. In all cases, peak gas temperatures, higher than 1100° C., are used for non-catalyzed decomposition of at least some of the ammonia.

Ammonia Flame Cracker 500 may be started by heating at least a portion of tubing 502 and/or tubing 505, or the catalyst 508, to a high temperature possibly exceeding the ammonia cracking temperature 312. This heating at startup may be accomplished by electrical resistive heating of components of Ammonia Flame Cracker 500, or by combustion of chemicals and subsequent passage of these combusted chemicals over surfaces within the Ammonia Flame Cracker 500. Fuels, stored separately from the ammonia, may be combusted with air or with ammonia and air, or ammonia may be combusted with substantially pure oxidizers or with oxidizer-enriched air, or with air. Burners and/or igniters (not shown) such as electric arcs, flame holders, surface mix burners, mixing burners or other burners, or catalysts, which are dedicated to combustion of chemicals during startup of ammonia flame cracker 500, may be placed within or in communication with region 504. The chemicals, once combusted, may be introduced into region 504, and from there the combusted chemicals travel through the space inside tubing 505, toward exit 507, and leave through exit 507. In some cases, the chemicals, combusted during startup, may form a combustible mixture when they react, and this combustible mixture may be used for starting and running an engine or other hydrogen-consuming apparatus while the Ammonia Flame Cracker 500 warms up. Otherwise, the combustible mixture may be burned with more air for additional heating, before passage over the surfaces of Ammonia Flame Cracker 500, if controls are provided which permit doing so safely. In some cases, the combusted chemicals may be introduced into region 504 and then purged through from region 504 to exit 507 at a very high rate during startup of ammonia flame cracker 500. In some cases, starting may be accomplished by flowing of a starting mixture consisting of ammonia and substantially pure oxygen into inlet 501 and combusting the starting mixture in region 504. The flow rate, equivalence ratio, and dimensions of tubings 502 and 505 may be selected so as to prevent flashing back of the starting mixture during at least a substantial portion of the starting period.

In some applications, only the hydrogen in the hydrogen-containing product mixture has value, and the hydrogen-containing product mixture's sensible heat, at possibly high temperatures, does not have value and may even present one or more problems. Such is the case for operation of an Ammonia Flame Cracker 500 for supplying hydrogen into an uncompressed zone of an engine, for example, the intake line of a piston engine. In some applications, it is desired to maximize the quantity of hydrogen, obtained from a given quantity of ammonia. Such is the case for operation of an Ammonia Flame Cracker 500 for fueling an engine or for supplying hydrogen to an SCR or other emissions cleanup device or system. Ammonia Flame Cracker 500 is suitable for these applications, because most of the sensible heat of the hot hydrogen-containing product mixture is recuperated into the incoming ammonia/air reactant mixture, thus raising the gas temperature in region 504 and lowering the hydrogen-containing product mixture's temperature before exiting through product outlet 507. An elevated gas temperature, in region 504, permits the use of a higher range of equivalence ratios, while obtaining full ammonia decomposition yield, than would be possible without recuperation of heat, according to curve 306. The heat required to bring the ammonia up from ambient temperature to the ammonia cracking temperature 312 is a large portion of an Ammonia Flame Cracker's total energy budget. The hydrogen-containing product mixture may be combusted in a region distant from the Ammonia Flame Cracker 500, for example, inside a combustion chamber of an engine, or a turbine or other burner such as a heating appliance. In some instances, only a small fraction (for example, less than 5%) of the chemical energy contained in the ammonia is lost during conversion of ammonia to hydrogen by the Ammonia Flame Cracker 500.

The Ammonia Flame Cracker 500 may also be used in applications which utilize both the heat released by combusting the hydrogen-containing product mixture, and the hydrogen-containing product mixture's sensible heat prior to combustion. Such is the case for operation of Ammonia Flame Cracker 500 supplying combustible gas to a turbine, a burner, or another heating appliance. Thus the efficiency of the Ammonia Flame Cracker 500, taken on the basis of chemical energy and sensible heat of the hydrogen-containing product mixture, out, over ammonia, in, may approach 100% if the heat loss, through vacuum space 518 and end 514, is recovered or made comparatively very small.

Figure 6:
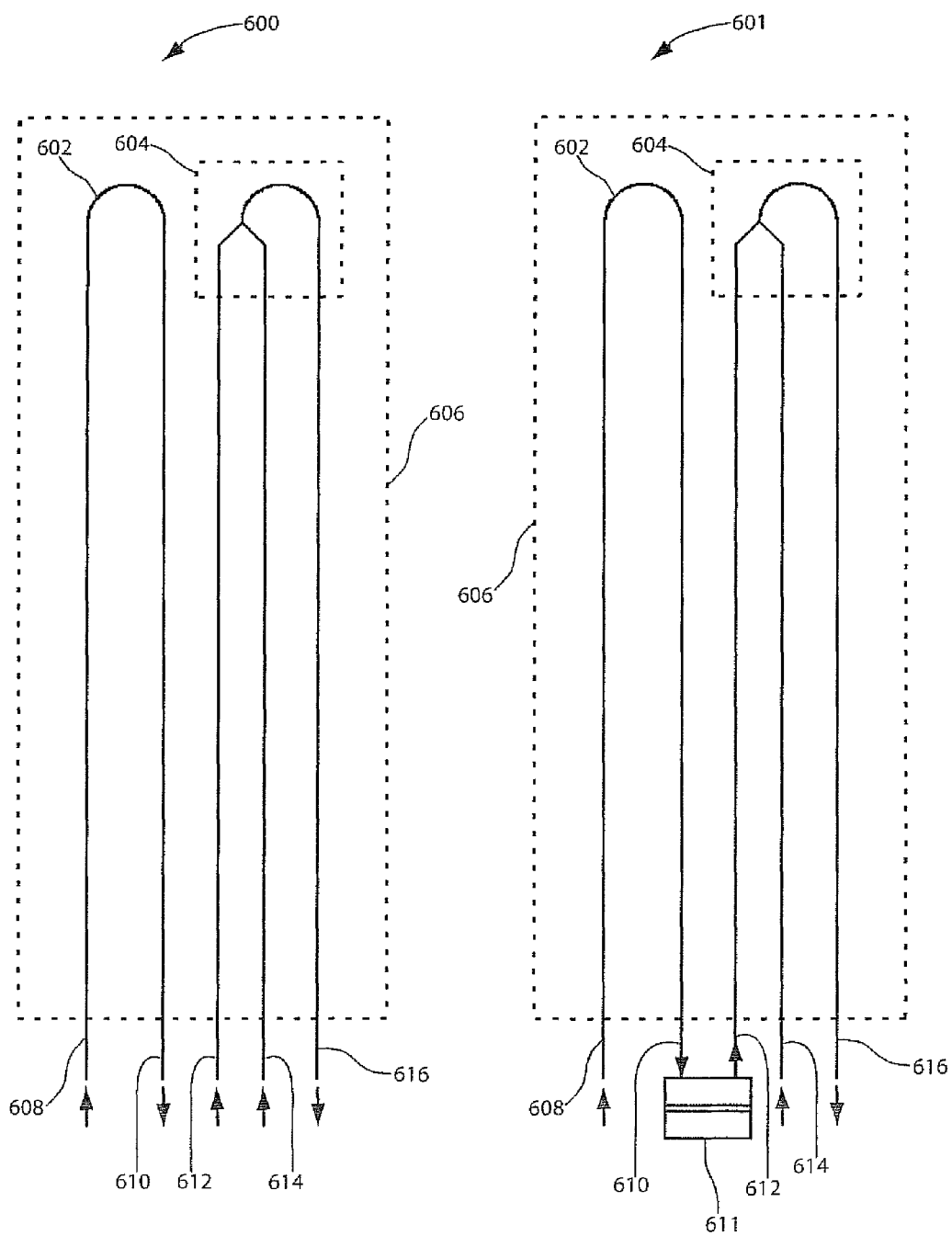
FIG. 6 is a schematic diagram of an Ammonia Flame Cracker with separate ammonia combustion and ammonia decomposition loops, and fuel cell system incorporating the same, according to one representative embodiment.

Referring to FIG. 6, a heat exchanged Ammonia Flame Cracker 600 with separate ammonia combustion and ammonia decomposition loops, and system 601 are shown. The theoretical upper performance limits concerning energy balance, ratio of ammonia cracked to ammonia combusted, and efficiency are all the same for ammonia crackers 500 and 600. Ammonia enters port 608, is brought up to a temperature which is generally higher than 1100° C., then the ammonia decomposes in the endothermic decomposition loop 602, and then the hydrogen-containing gas mixture is brought back down in temperature before exiting port 610. If the ammonia fully decomposes in loop 602, then the mixture exiting port 610 will contain 75% hydrogen and 25% nitrogen by volume. A fuel gas enters port 612 and air enters port 614. The fuel gas may be ammonia, or it may be another fuel stored separately from the ammonia, or it may be a portion of the hydrogen-containing mixture exiting from port 610. The fuel gas and air are preheated separately, then mixed and burned in a burner 604. The burner 604 may mix the fuel gas and air in a distributed way, such that the heat release is spread out, thus lowering peak temperatures in the burner 604 and facilitating heat transfer from burner 604 to endothermic decomposition loop 602. Heat is recovered from the exhaust gas after it leaves the burner 604, and before the exhaust gas exits from port 616. The arrows show the direction of flow.

At least enough air is supplied to the burner 604 such that all of the fuel gas is combusted, and more than sufficient air may be used for the purposes of balancing the heat capacities between the exothermic loop containing the burner 604 and the endothermic loop 602, for reducing $NO_x$ emissions by the burner 604, for lowering peak temperatures in the burner 604, or to ensure the complete burn-up of the fuel gas entering port 612. The fuel gas entering port 612 and air entering port 614 may be mixed in stoichiometric proportions in burner 604, such that any small quantities pollutants in the exhaust gas may be completely removed with an exhaust cleanup catalyst (not shown) before exiting port 616. Heat is recovered from the exhaust gas after it leaves the burner 604, and before it exits from port 616. Generally, a heat exchange relationship may exist between any two or all elements contained within the heat exchanger 606. In particular, heat is transferred from the burner 604 to the endothermic decomposition loop 602.

Ammonia Flame Cracker 600 may be operated as a stand-alone device or it may be incorporated into an engine system or other system for supplying hydrogen to a hydrogen-consuming apparatus. Ammonia Flame Cracker 600 may be further used in applications which require a hydrogen-containing product gas which is devoid of moisture and residual oxygen. These applications include annealing, brazing, heat treat, and use of the hydrogen-containing product mixture as a combustion promoter for an engine which burns mostly raw ammonia. For other applications, it is advantageous to obtain a hydrogen-containing product mixture which is of reduced nitrogen content and devoid of other impurities, and thus requires less work to purify the hydrogen by means known to the art. These include use of the hydrogen as a lift gas for a balloon and the generation of high purity tank hydrogen.

Ammonia Flame Cracker 600 may be incorporated into a fueling system 601 for a fuel cell 611. Ammonia enters port 608, and the ammonia is at least partially decomposed in loop 602. The hydrogen gas mixture, exiting from port 610, is fed into the fuel cell 611. At least a portion of the hydrogen is consumed by the fuel cell 611, and the hydrogen-depleted mixture is used as the fuel gas, which enters port 612. This hydrogen-depleted mixture which is retrieved from a fuel cell, after at least some of the hydrogen is consumed, is referred to as an "anode off-gas" elsewhere in the literature. System 601 may be operated toward the advantages that none of the fuel is wasted, no gas separators are needed, Ammonia Flame Cracker 600 and system 601 may be fully non-catalytic, impurities do not accumulate in the fuel cell 611, throughput is not limited by quantity of catalyst, and the Ammonia Flame Cracker 600 and system 601 may be operated with ammonia and normal air as the only inputs. Ammonia Flame Cracker 600 and system 601 may be started by resistive heating of one or more elements contained in the heat exchanger 606, or they may be started by combustion of ammonia and/or other fuels with air and/or with other oxidizers in the burner 604.

Figure 7:
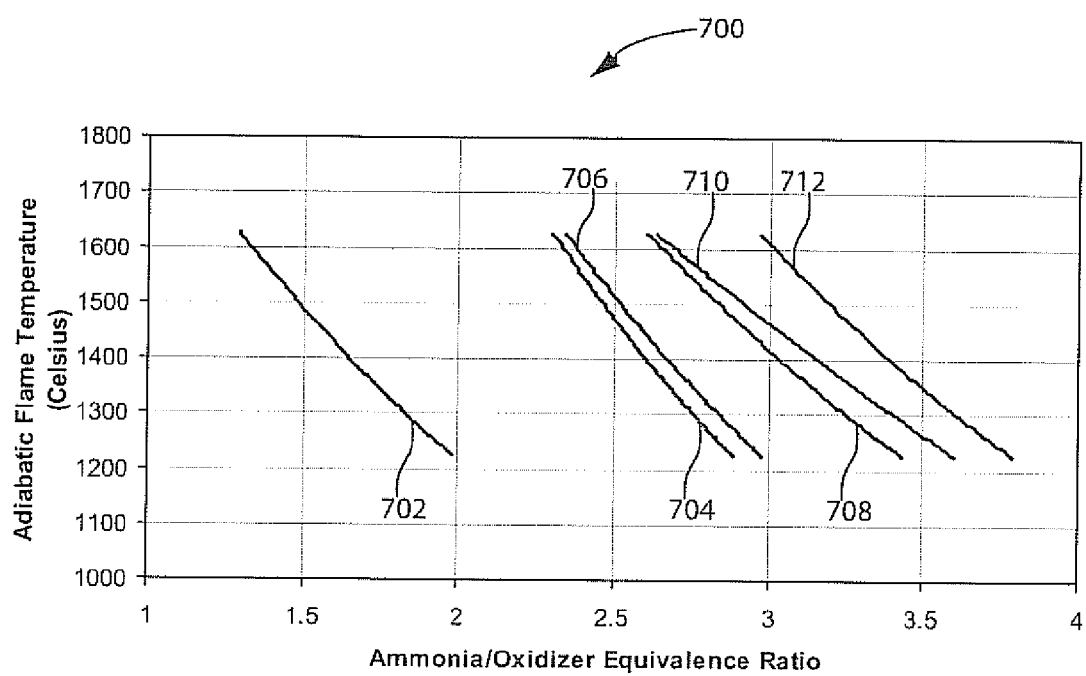
FIG. 7 is a graph showing the adiabatic flame temperature for different mixtures of ammonia and oxidizers which may be used during ammonia cracker startup.

Referring to FIG. 7, a graph 700 is shown of the adiabatic flame temperature of mixtures of ammonia with various oxidizers, at different ammonia/oxidizer equivalence ratios. The curves in graph 700 were calculated using the following assumptions: air consists of a mix of 79% nitrogen and 21% oxygen by volume, the ammonia cracking temperature is 1500 Kelvin=1227° C., the ammonia and all oxidizers are delivered to a reaction zone in gaseous form and without impurities (such as water or excess nitrogen), and the initial temperature of the ammonia/oxidizer mixture is 25° C. Air is not referred to as a pure oxidizer here, due to its high nitrogen content. Also, the effects of other energy inputs, such as electric arcs, resistive heating, heat exchange into the mixture or into components of the mixture prior to combustion, and additional air for further burning of the mixture, are ignored. Curves 702, 704, 706, 708, 710, and 712 correspond to ammonia/oxidizer mixtures in which the oxidizer is air, pure oxygen, nitrogen dioxide, nitrous oxide, hydrogen peroxide, and nitric oxide, respectively. At least some of these oxidizers will support combustion in a premixed flame in at least a portion of the equivalence ratio range shown, without the need for catalysts or preheating of the mixture. For example, rich, premixed ammonia/oxygen mixtures were found to burn quite readily at equivalence ratios less than about 2.4. In another example, ammonia and substantially pure oxygen are metered separately into a mixing burner, and this arrangement was found to support a very high total throughput without blowing out the flame, with or without preheating, without a catalyst, and at a very broad range of ammonia/oxygen equivalence ratios. These mixtures may be combusted by various means disclosed herein or known to the art, and the burned mixture may then be flowed over surfaces within Ammonia Flame Crackers 400, 500 and 600 for the purpose of bringing portions of Ammonia Flame Crackers 400, 500 and 600 up to operating temperature.

The rightmost points of curves 702, 704, 706, 708, 710, and 712 correspond to sufficient quantities of oxidizer in the mixtures to move the mixtures from point 102 to point 110 on trajectory 104, and thus decompose all of the remaining ammonia at an adiabatic flame temperature which is the ammonia cracking temperature, assumed to be 1227° C. The leftmost points correspond to a chosen maximum adiabatic flame temperature of 1900 Kelvin=1627° C., which exceeds the ammonia cracking temperature by a wide margin and is near the durability limit of silicon carbide. For a broad class of pure oxidizers, ammonia/oxidizer equivalence ratios in the range of 2 to 3.5 appear to be appropriate for bringing Ammonia Flame Crackers up to an operating temperature which may be higher than the ammonia cracking temperature 112 and lower than the maximum tolerable temperature for some specific materials. In some instances, ammonia/oxidizer equivalence ratios of less than 2 may be used during an early portion of the starting period. The ammonia/oxidizer equivalence ratio may then be increased during a later portion of the starting period as the Ammonia Flame Cracker warms up. The combusted starting mixture may be used for fueling an engine or other hydrogen-consuming apparatus when the mixture's hydrogen fraction becomes sufficiently large.

Sufficiently rich mixtures, of ammonia and pure oxidizers, make flammable hydrogen gas mixtures when they react, and these flammable mixtures may be used to run an engine or other hydrogen-consuming apparatus while the Ammonia Flame Cracker is warming up. Otherwise, the mixture may simply be purged through the Ammonia Flame Cracker, or mixed with additional air and burned for additional heat within the Ammonia Flame Cracker, possibly at peak gas temperatures exceeding material durability limits, if controls are provided, which permit doing so safely.

Figure 8:
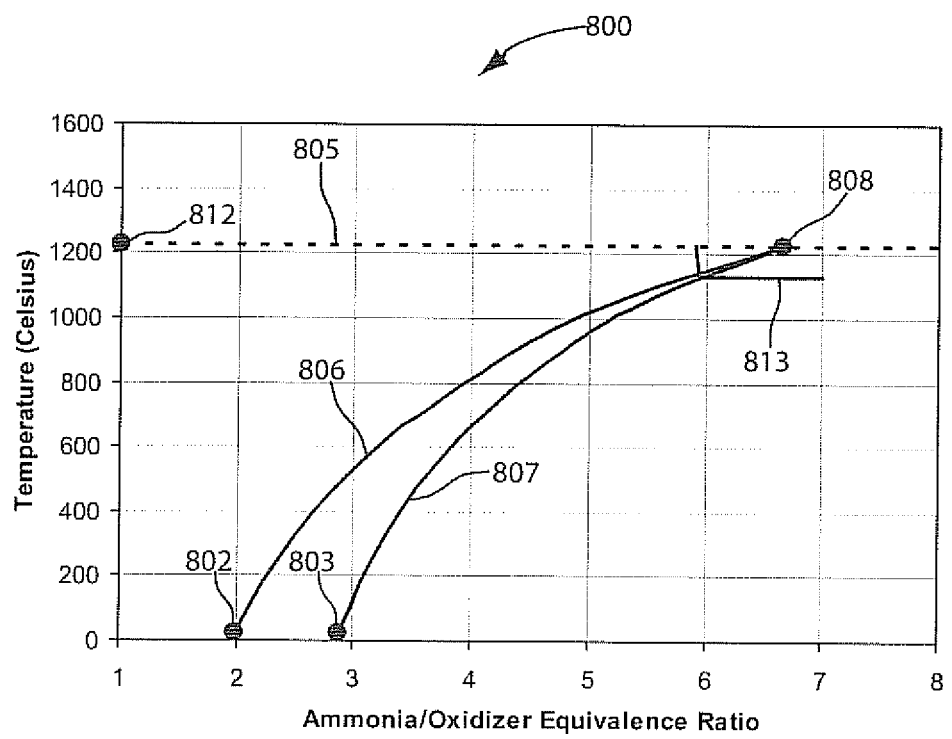
FIG. 8 is a graph showing a representative performance curve of a heat exchanged Ammonia Flame Cracker among curves from a theoretical model.

Referring to FIG. 8, a graph 800 is shown, and this graph contains information relevant to the operation of Ammonia Flame Crackers in which ammonia reacts with either pure oxygen or with air. The air is modeled as consisting of 21% oxygen and 79% nitrogen by volume, and the ammonia cracking temperature 812 is assumed to be 1500 Kelvin=1227° C., for the calculation of the curves in graph 800. Additional heating of the mixture, due to the application of electric power to one or more elements, is assumed to be zero for the calculation of the curves in graph 800. Horizontal dashed line 805 shows the placement of features in graph 800 in relation to the ammonia cracking temperature 812.

Ammonia and normal air may be preheated separately to a temperature corresponding to a point somewhere between points 102 and 108 on trajectory 104, and then mixed in a burner, wherein the newly formed mixture combusts and decomposes. For this discussion, the ammonia and air preheat temperatures are assumed to be the same, and the ammonia and air are assumed to react when they are mixed. Non-catalytic combustion, of separate streams of ammonia and normal air, may occur at the mixing interface if the preheat temperature is higher than the ammonia autoignition temperature of about 850° C. Once started, the reactions are assumed to proceed adiabatically, and the heat released, by the exothermic formation of water, moves the mixture along trajectory 104 toward point 110. Each point on curve 806, between points 802 and 808, describes combinations of reactant preheat "Temperature" and "Ammonia/Oxidizer Equivalence Ratio", for which just enough heat is released, by the exothermic formation of water, to move the mixture from the preheat temperature corresponding to a point somewhere between points 102 and 108, to point 110 on trajectory 104, when all of the oxygen is consumed. A substantially full ammonia decomposition yield is thus obtained. Point 802 on curve 806 corresponds to a preheat temperature of 25° C., and a preheat condition corresponding to point 102 on trajectory 104. For point 802, the ammonia/air equivalence ratio is 1.98. Therefore, when the ammonia/air equivalence ratio is 1.98, just enough heat is released, by the exothermic formation of water, to move the mixture from point 102 to point 110 on trajectory 104 when all of the oxygen is consumed, assuming that the mixture will react. Curve 806 ends at the ammonia cracking temperature 812, here assumed to be 1227° C., at point 808, which is drawn on horizontal dashed line 805 directly across from the ammonia cracking temperature 812. Point 808 corresponds to a preheat temperature which is equal to the ammonia cracking temperature 812 and a preheat condition corresponding to point 108 on trajectory 104. For point 808, an equivalence ratio is selected, such that just enough heat is released, by the exothermic for nation of water, to move the mixture from point 108 to point 110 on trajectory 104 when all of the oxygen is consumed. Point 808 thus corresponds to the previously described theoretical upper performance limit, and is assigned an "Ammonia/Oxidizer Equivalence Ratio" of 6.66. The separate ammonia and air reactant streams may be preheated by means of counterflow heat exchange with the outgoing product mixture. Curves 806 and 306 are in fact the same curve because the total energy of the mixture, at a given preheat "Temperature" below the ammonia cracking temperature 812, is the same, for components preheated separately and then mixed, as it is for components which are mixed and then preheated.

Ammonia and pure oxygen may be preheated separately to a temperature corresponding to a point somewhere between points 102 and 108 on trajectory 104, and then mixed in a burner, wherein the newly formed mixture combusts and decomposes. For this discussion, the ammonia and oxygen preheat temperatures are assumed to be the same, and the ammonia and oxygen are assumed to react when they are mixed. Non-catalytic combustion, of separate streams of ammonia and pure oxygen, occurs readily at the mixing interface for a broad range of preheat temperatures and for all ammonia/oxygen equivalence ratios of interest. Once started, the reactions are assumed to proceed adiabatically, and the heat released, by the exothermic formation of water, moves the mixture along trajectory 104 toward point 110. Each point on curve 807, between points 803 and 808, describes combinations of reactant preheat "Temperature" and "Ammonia/Oxidizer Equivalence Ratio", for which just enough heat is released, by the exothermic formation of water, to move the mixture from the preheat temperature corresponding to a point somewhere between points 102 and 108, to point 110 on trajectory 104, when all of the oxygen is consumed. A substantially full ammonia decomposition yield is thus obtained. Point 803 on curve 807 corresponds to a preheat temperature of 25° C., and a preheat condition corresponding to point 102 on trajectory 104. For point 803, the ammonia/oxygen equivalence ratio is 2.88. Therefore, when the ammonia/oxygen equivalence ratio is 2.88, just enough heat is released, by the exothermic formation of water, to move the mixture from point 102 to point 110 on trajectory 104 when all of the oxygen is consumed. Curve 807 ends at the ammonia cracking temperature 812, and at an equivalence ratio for which just enough heat is released, by the exothermic formation of water, to move the mixture from point 108 to point 110 on trajectory 104 when all of the oxygen is consumed. Therefore, curve 807 ends at the same point 808, at which curve 806 also ends, and at the same "Ammonia/Oxidizer Equivalence Ratio" of 6.66. The separate ammonia and oxygen reactant streams may be preheated by means of counterflow heat exchange with the outgoing product mixture.

The distance, separating curves 806 and 807, is due to the energy required to bring inert components of normal air, mostly nitrogen, up from a preheat "Temperature" to the ammonia cracking temperature 812. This distance becomes small in the vicinity of point 808. Thus the use of pure oxygen vs. normal air makes little difference for preheat temperatures in the vicinity of the ammonia cracking temperature 812. However, the use of substantially pure oxygen is convenient for starting, and in some cases, the use of substantially pure oxygen may be continued during fully warmed-up operation. Respective curves for impure mixtures containing mostly oxygen, for oxygen-enriched air, or for applications using a combination of pure oxygen and air, lie somewhere between curves 806 and 807.

Figure 9:
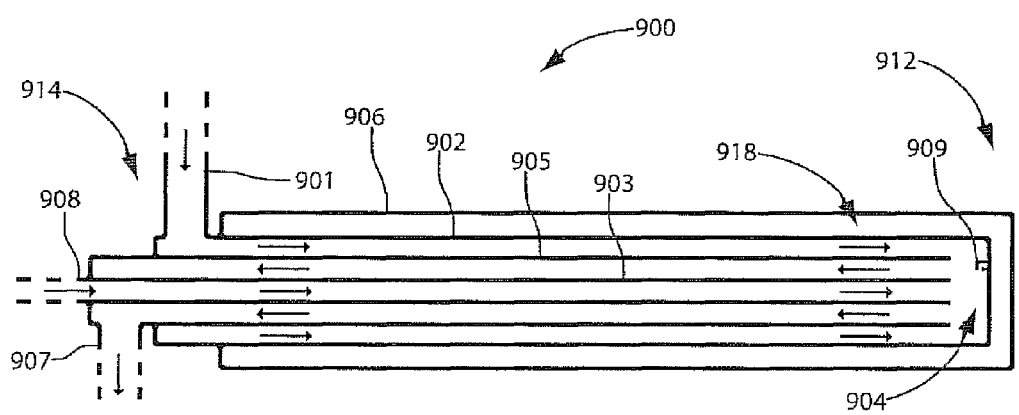
FIG. 9 is a schematic diagram of a heat exchanged Ammonia Flame Cracker according to one representative embodiment.

Referring to FIG. 9, according to one embodiment, an Ammonia Flame Cracker 900 includes concentric, round tubings 902, 903, 905, and 906, and an igniter 909. The igniter 909 may be a spark gap, and is used for igniting mixtures which are for starting and/or running Ammonia Flame Cracker 900. Igniter 909 may be used during startup, or for restarting at the end of intermittent periods of flow cessation, or at any other time. The tubings 906 and 902, 902 and 905, and 905 and 903 are joined near end 914. The construction methods and materials requirements are similar to those of corresponding tubings in Ammonia Flame Cracker 500. In addition to the functions later described, tubing 903 may also be used as a conduit for servicing one or more components of Ammonia Flame Cracker 900, for passage of electrical wires (not shown) to igniter 909 or to a thermocouple junction (not shown), or as a sight tube for an optical sensor placed near end 914 which monitors a temperature at or near end 912.

Ammonia enters the Ammonia Flame Cracker 900 through inlet 901 and travels through the space between tubings 902 and 905 until the ammonia reaches region 904. Air or pure oxygen enters through inlet 908 and travels through the space within tubing 903 until it reaches region 904. The ammonia and air or oxygen mix and combust in region 904, wherein the mixture becomes a hydrogen-containing product mixture. Finally, the hydrogen-containing product mixture travels toward exit 907, through the space between tubings 905 and 903, and leaves the Ammonia Flame Cracker 900 through exit 907. The small arrows show the direction of flow. The Ammonia Flame Cracker 900 is operable under other permutations of the reactant entries and product exit.

Tubing 906 is joined to tubing 902 near end 914 and it forms the outer wall of a vacuum jacket, and tubing 902 forms the inner wall of this same vacuum jacket. Vacuum space 918 is thus bounded by the inner surface of tubing 906 and the outer surface of tubing 902. This vacuum space prevents conductive and convective heat loss from Ammonia Flame Cracker 900. Tubing 906 may be constructed of materials which are forbidden for use in portions, near end 912, of tubings 902, 903, and 905. For example, some portions of tubings 902, 903, and 505, especially portions near end 912, must be constructed of materials that can withstand temperatures near 1250° C. or higher, whereas tubing 906 may be constructed of materials which may melt at this temperature, for example, glasses, metals, and high reflectivity coatings that melt at temperatures which are lower than the ammonia cracking temperature 812. The inner surface of tubing 906 may be coated with a metal film, for example gold, silver, copper or aluminum, which has a high average reflectivity for blackbody radiation at 1250° C. The high reflectivity coating on the inner surface of tubing 906 reduces radiative heat loss from tubing 902, and also helps to keep tubing 906 relatively cool. Other description of the vacuum jacket is the same for Ammonia Flame Cracker 900 as it is for Ammonia Flame Cracker 500.

Curve 813 describes the gas temperature, just prior to mixing in region 904, of Ammonia Flame Cracker 900, using ammonia and pure oxygen, at different ammonia/oxygen equivalence ratios. Curve 813 is a "performance curve" and it is representative of a family of curves (not shown) which characterize the reactant preheating effectiveness of Ammonia Flame Cracker 900. In this particular example, curve 913 was calculated for an Ammonia Flame Cracker 900 which has a product-to-reactant temperature drop of about 100° C. near end 912, assumed to be the same for the ammonia as it is for the oxygen, which is representative of a practical design center. In this particular example, the product-to-reactant temperature drop is mostly due to resistance to heat flow between the inside and outside of tubings 903 and 905, but the calculation also includes the effects of a relatively small heat loss through the vacuum space 918. During operation of Ammonia Flame Cracker 900 on portions of curve 813 which are below and to the right of curve 807, the reacting gas mixture ends its excursion on trajectory 104 somewhere to the left of point 110, and there is a large ammonia fraction in the product mixture. During operation of Ammonia Flame Cracker 900 on the intersection of curves 813 and 807, the reacting gas mixture ends its excursion on trajectory 104 at point 110, and there may be a small ammonia fraction in the product mixture. During operation of Ammonia Flame Cracker 900 on portions of curve 813 which are between curve 807 and line 805, the reacting gas mixture ends its excursion on trajectory 104 somewhere slightly above and to the right of point 110, but the temperature in the space between tubings 902 and 905 is not yet high enough to begin decomposing the ammonia before it reaches region 904, and there may be very little or no ammonia in the product mixture. During operation of Ammonia Flame Cracker 900 at "Ammonia/Oxidizer Equivalence Ratios" which are lower than the equivalence ratio at the intersection of curve 813 and line 805, some of the incoming ammonia may decompose before reaching region 904. One or more separate components of the incoming mixture may accept preheating beyond the ammonia cracking temperature, therefore means of monitoring temperature and feedback control may be required to prevent thermal runaway and to maintain a desired set of operating temperatures. If an Ammonia Flame Cracker 900 reaches a state of being controlled to operate at gas preheat temperatures in the vicinity of the ammonia cracking temperature 812, then the operation may be switched from using pure oxygen, to using normal air. Otherwise, the Ammonia Flame Cracker maintains assured functionality while continuing to use pure oxygen or oxygen-enriched air. The steepness of curve 813, in portions above and to the left of its intersection with curve 807, is determined by the relative strength of heat exchanger losses and radiative losses of Ammonia Flame Cracker 900.

Ammonia Flame Cracker 900 may be started by use of the igniter 909 to ignite the incoming ammonia and oxygen. The ammonia/oxygen equivalence ratio may be increased, according to curve 807, as the preheat temperatures increase during warm-up. The ends of tubings 903 and 905, as shown at end 912, define a mixing plane for a re-entrant surface mix burner. A heat exchanged re-entrant surface mix burner is thus incorporated into Ammonia Flame Cracker 900, for the purpose of decomposing ammonia. Convective elements, nozzles, or other mixing structures (not shown) may be used for facilitating heat exchange throughout, and mixing in region 904. Mixing may be further facilitated by the inclusion of some oxygen or air with the ammonia entering inlet 901. Preferably, the mixture entering inlet 901 should be richer than the upper flammability limit for ammonia in the mixture, such that the mixture will not support flame propagation into portions of the mixture which are not yet fully preheated. If operation of Ammonia Flame Cracker 900 were to revert to total premixing of ammonia with air or pure oxygen entering inlet 901, and cessation of flow at inlet 908, then the Ammonia Flame Cracker 900 becomes the same as Ammonia Flame Cracker 500, and the Ammonia Flame Cracker 900 shows a particular means for starting, using substantially pure oxygen which enters at inlet 908, with an igniter 909, and a mixing burner incorporated into the design.

For an Ammonia Flame Cracker 900, a comparatively small "pilot" quantity of substantially pure oxygen, entering inlet 908, may be used for maintaining combustion in region 904 of a much larger quantity of a rich mixture containing ammonia and oxygen entering inlet 901. The quantity of pilot oxygen may be chosen such that the mixture entering inlet 901 will be heated to the ammonia cracking temperature 812 and thereby undergo the avalanche reactions. The total ammonia/oxidizer may be chosen according to curve 806, curve 807, or an intermediate curve between curves 806 and 807, as appropriate for a given average preheat "Temperature", and for the combination of air or substantially pure oxygen, and ammonia entering inlet 901 and substantially pure oxygen entering inlet 908. At startup, a low total ammonia/oxidizer equivalence ratio may be used. The total ammonia/oxidizer equivalence ratio may be increased, according to curve 806, curve 807, or an intermediate curve between curves 806 and 807, as the preheat "Temperature" increases during warm-up.

Pilot hydrogen entering inlet 908 may also be used for sustaining combustion of a mixture containing ammonia and oxygen entering inlet 901. The hydrogen may be a recycled portion of the product mixture exiting outlet 907. For the use of pilot hydrogen, the average preheat temperature should be higher than the autoignition temperature of hydrogen, which is about 500° C., and preferably the preheat temperature should be in the vicinity of the ammonia cracking temperature 812. The hydrogen feedback flow should also be sufficiently high so as to raise the temperature of the mixture to the ammonia cracking temperature 812 and thus precipitate the avalanche reactions. Hydrogen feedback can also be obtained by passage of a portion of the hydrogen product mixture, from the space between tubings 903 and 905 to the space between tubings 902 and 905, through perforations (not shown) in tubing 905 near end 912. The space between tubings 902 and 905 may be narrowed in the vicinity of the perforations in tubing 905 so as to generate the relative vacuum required to drive the hydrogen feedback flow. In all cases, peak gas temperatures, higher than 1100° C., are used for non-catalyzed decomposition of at least some of the ammonia.

Up to this point, the description, of Ammonia Flame Cracker 900, assumes that the preheat temperatures of the ammonia-containing gas mixture entering inlet 901, and gas mixture entering inlet 908, are the same. However, if substantially pure oxygen is used at inlet 908, then the Ammonia Flame Cracker 900 may be operated satisfactorily with a small penalty, which is associated with a poor preheating effectiveness for the oxygen entering inlet 908. Even without any preheating of the oxygen entering inlet 908, a full ammonia decomposition yield may be obtained for total equivalence ratios greater than 6, if the ammonia entering inlet 901 is preheated to a temperature which is very near the ammonia cracking temperature 812. In some cases, the oxygen entering inlet 908 may be deliberately kept cool by chosen design, thus permitting the use of materials, for constructing portions of Ammonia Flame Cracker 900, which may be attacked by oxygen at high temperatures.

Up to this point, the description, of Ammonia Flame Cracker 900, assumes that no catalyst is present, and that surfaces of Ammonia Flame Cracker 900 are selected or treated so as to be non-catalytic. However, a catalyst (not shown) may optionally be placed in region 904 or within the space between tubings 903 and 905, near end 912. A small quantity of catalyst (not shown) may be placed in the space between tubings 902 and 905, such that a comparatively small quantity of hydrogen may be present for supporting combustion in region 904 of ammonia entering inlet 901, with air entering inlet 908.

Ammonia Flame Crackers disclosed herein share particular common characteristics. These shared characteristics include the decomposition of ammonia by means of combustion of some of the ammonia or by combustion of products of ammonia decomposition. All Ammonia Flame Crackers disclosed herein share a theoretical upper performance limit corresponding to a full ammonia decomposition yield obtained at a total ammonia/air or ammonia/oxygen ratio of 6.66. The shared characteristics, of Ammonia Flame Crackers disclosed herein, also include peak gas temperatures equaling or exceeding the ammonia cracking temperature 112, as required for the non-catalyzed decomposition of at least some of the ammonia. The ammonia cracking temperature 112 appears to be higher than 1100° C., and lower than about 1400° C. Peak gas temperatures exceeding the ammonia cracking temperature 112 may also be reached without departing from the scope and intent of the invention, because the non-catalyzed decomposition of ammonia is only further enhanced at temperatures exceeding the ammonia cracking temperature 112.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Having described our invention, we claim:

1. A method of cracking ammonia, comprising the steps of:
providing a counterflow heat exchanger having a first and second separate inlets and an outlet;
flowing gaseous ammonia into the first inlet and an oxygen-containing gas mixture into the second inlet;
wherein the ammonia and the oxygen-containing gas mixture are flowed in a substantially ammonia-rich proportion;
separately preheating the ammonia and the oxygen containing gas mixture by the heat exchanger;
separately introducing the preheated ammonia and the preheated oxygen-containing gas mixture into a mixing burner;
combusting the preheated ammonia and oxygen-containing gas mixture in the mixing burner, thus forming a hydrogen-containing gas mixture from the ammonia and from the oxygen-containing gas mixture;
cooling the hydrogen-containing gas mixture by the heat exchanger, wherein heat is transferred from the hydrogen-containing gas mixture, to the ammonia and to the oxygen-containing gas mixture; and
flowing the cooled hydrogen-containing gas mixture out of the outlet.

2. The method of claim 1, wherein the preheated ammonia and the preheated oxygen-containing gas mixture are combusted at a flame temperature higher than 1100° C.

3. The method of claim 1, wherein the oxygen-containing gas mixture, entering the second inlet, is substantially pure oxygen.

4. The method of claim 1, further comprising:
controlling the total ammonia/oxidizer equivalence ratio of the incoming mixture components, such that a desired ammonia decomposition yield is obtained.

5. The method of claim 1, further comprising:
providing a temperature probe for monitoring an operating temperature; and
controlling the total ammonia/oxidizer equivalence ratio of the incoming mixture components, such that a desired operating temperature is obtained.

6. The method of claim 1, further comprising the steps of:
at least partially purifying the hydrogen; and
storing the hydrogen for later use.

7. The method of claim 1, further comprising the steps of:
at least partially purifying the hydrogen; and
using the hydrogen as a balloon lift gas.

8. The method of claim 1, further comprising the step of:
using the hydrogen to at least partially fuel at least one of the following: an internal combustion engine, a turbine, a fuel cell, a furnace, a heating appliance, or a cooking appliance.

9. The method of claim 1, further comprising the step of:
supplying the hydrogen to an exhaust emissions control device.

\* \* \* \* \*